United States Patent
Guo et al.

(10) Patent No.: US 11,341,746 B2
(45) Date of Patent: May 24, 2022

(54) METHOD AND APPARATUS FOR IDENTIFYING A DAMAGED PART OF A VEHICLE, SERVER, CLIENT AND SYSTEM

(71) Applicant: Alibaba Group Holding Limited, George Town (KY)

(72) Inventors: Zhiyou Guo, Zhejiang (CN); Yong Fang, Zhejiang (CN)

(73) Assignee: Advanced New Technologies Co., Ltd., George Town (KY)

( * ) Notice: Subject to any disclaimer, the term of this patent is extended or adjusted under 35 U.S.C. 154(b) by 2 days.

(21) Appl. No.: 16/879,367

(22) Filed: May 20, 2020

(65) Prior Publication Data
US 2020/0349353 A1    Nov. 5, 2020

Related U.S. Application Data

(63) Continuation of application No. PCT/CN2018/107217, filed on Sep. 25, 2018.

(30) Foreign Application Priority Data

Nov. 21, 2017   (CN) .......................... 201711161926.9

(51) Int. Cl.
*G06K 9/62* (2022.01)
*G06V 20/20* (2022.01)
(Continued)

(52) U.S. Cl.
CPC .......... *G06V 20/20* (2022.01); *G06K 9/6201* (2013.01); *G06V 10/235* (2022.01); *G06V 10/25* (2022.01); *G06V 10/40* (2022.01); *G06V 2201/08* (2022.01)

(58) Field of Classification Search
CPC ............. G06K 9/00671; G06K 9/2081; G06K 9/3233; G06K 9/46; G06K 9/6201; G06K 2209/23; G06Q 40/08
See application file for complete search history.

(56) References Cited

U.S. PATENT DOCUMENTS

2003/0046003 A1 *   3/2003  Smith .................... G07C 5/085
                                                                    701/32.2
2015/0106133 A1     4/2015  Smith, Jr.
(Continued)

FOREIGN PATENT DOCUMENTS

CN          104 268 783 A     1/2015
CN          106 203 644 A    12/2016
(Continued)

OTHER PUBLICATIONS

European Extended Search Report in related EP Application No. 18881645.8, dated Jul. 6, 2021.
(Continued)

*Primary Examiner* — Matthew C Bella
*Assistant Examiner* — Kathleen M Broughton
(74) *Attorney, Agent, or Firm* — Faegre Drinker Biddle & Reath LLP

(57) ABSTRACT

Disclosed in the embodiments of the present application are method and apparatus for identifying damaged part of vehicle, server, client and system. The method comprises: pre-establishing identifiable vehicle feature library including vehicle parts and feature correspondence library including relative positional relationships of these parts. During the loss assessment image capturing procedure, the user manually delineates the damage location on the client. The identifiable vehicle features in the image can be identified by the server, the relative positions of the identifiable features and the mark delineated by user are determined according to these identifiable features. This relative position is matched in the feature correspondence library to determine the damaged part, enables assisted locating of the damage location by manual and simple operations by the user at the scene, assists insurance companies in locating damaged part of (Continued)

vehicle, thereby improving the accuracy and processing efficiency of identifying damaged part in loss assessment.

6 Claims, 12 Drawing Sheets

(51) Int. Cl.
*G06V 10/25* (2022.01)
*G06V 10/40* (2022.01)
*G06V 10/22* (2022.01)

(56) References Cited

U.S. PATENT DOCUMENTS

| | | | |
|---|---|---|---|
| 2016/0071258 A1* | 3/2016 | McClung, III | G06Q 30/0278 705/4 |
| 2017/0293894 A1 | 10/2017 | Taliwal | |
| 2020/0349353 A1 | 11/2020 | Guo et al. | |

FOREIGN PATENT DOCUMENTS

| | | | | |
|---|---|---|---|---|
| CN | 106 600 422 A | | 4/2017 | |
| CN | 106780048 A | * | 5/2017 | |
| CN | 107340120 A | * | 11/2017 | |
| CN | 107358596 A | * | 11/2017 | ......... G06K 9/00664 |
| CN | 108 090 838 A | | 5/2018 | |
| GN | 107358596 A | | 11/2017 | |
| JP | 3808182 B2 | * | 8/2006 | |
| WO | 2018191437 A1 | | 10/2018 | |

OTHER PUBLICATIONS

WIPO translation of International Search Report of International Application No. PCT/CN2018/107217, dated Jan. 4, 2019, 2 pgs.
WIPO translation of Written Opinion of the International Searching Authority of International Application No. PCT/CN2018/107217, dated Jan. 4, 2019, 4 pgs.
Written Opinion issued in Singapore Application No. 11202004704Q, dated Dec. 17, 2021, 10 pages.

* cited by examiner

METHOD AND APPARATUS FOR IDENTIFYING A DAMAGED PART OF A VEHICLE, SERVER, CLIENT AND SYSTEM

This application is a continuation of International Application No. PCT/CN2018/107217, filed on Sep. 25, 2018, which claims priority to Chinese Patent Application No. 201711161926.9, entitled "Method and device for identifying vehicle damaged components, server, client, and system", filed on Nov. 21, 2017, both of which are hereby incorporated by reference in their entireties.

TECHNICAL FIELD

The embodiments of the present description relate to the technical field of computer data processing, more particularly, to method and apparatus for identifying a damaged part of a vehicle, a server, a client and system.

BACKGROUND

Motor vehicle insurance (or car insurance for short) refers to a type of commercial insurance that is liable for compensation for personal damage or property damage caused by a natural disaster or accident on a motor vehicle. With the development of economy, the number of motor vehicles continues to increase. At present, car insurance has become one of the largest types of insurance in China's property insurance business.

When an insured vehicle is involved in a traffic accident, an insurance company usually first investigates and assesses the losses at the scene. The vehicle loss assessment involves various aspects of technology and benefits such as subsequent repair and evaluation, which is a very important procedure in the entire car insurance service. With the development of technology and the business development requirements such as fast loss assessment and claims settlement, currently, in the event of a car accident, the way of remote survey and loss assessment is becoming more and more common. In this way, the insurance companies (loss assessment personnel, surveyors, or AI loss assessment systems) determine the extent and degree of damage to the vehicles in accident by means of vehicle damage photos taken by the owners of the vehicles at the scene using their mobile phones (or other terminal devices), and then determine the repair plan, evaluate the damage, etc. Due to inadequate car insurance knowledge or limited photography skill of owners of accident vehicles, insurance companies often fail to identify damaged parts, or produce a large number of redundant invalid photos, when using the vehicle damage photos taken by the vehicle owners using their mobile phones at the scene, thereby affecting the efficiency and accuracy of the loss assessment process.

Therefore, there is an urgent need in the industry for a solution that can identify damaged parts in an image more accurately.

SUMMARY

An object of the embodiments of the present description is to provide a method and an apparatus for identifying a damaged part of a vehicle, a server, a client and a system, which enables assisted locating of the damage location by identifying the relative positions of the vehicle features and the mark delineated by the user in the image, thereby improving the accuracy and processing efficiency of identifying a damaged part in loss assessment, and greatly improving the user experience.

The method and apparatus for identifying a damaged part of a vehicle, server, client and system as provided in the embodiments of the present description are implemented as follows:

A method for identifying a damaged part of a vehicle, comprising the steps of:
acquiring, by a client, a captured image of the vehicle;
determining, by the client, a damaged area based on an act of marking a damage location in the captured image, thereby forming a marked image;
sending, by the client, the marked image to a server;
identifying, by the server, feature parts in the marked image, and determining a relative positional relationship between the feature parts and the damaged area based on the position of the feature part and the damaged area in the marked image;
matching, by the server, the relative positional relationship in a feature correspondence library to obtain a corresponding related part; and
determining, by the server, a damaged part in the captured image based on the related part.

A method for identifying a damaged part of a vehicle, comprising the steps of:
receiving a marked image uploaded by a client, the marked image including a damaged area determined based on an act of marking a damage location in a captured image;
identifying a feature part in the marked image, and determining a relative positional relationship between the feature parts and the damaged area based on the position of the feature part and the damaged area in the marked image;
matching the relative positional relationship in a feature correspondence library to obtain a corresponding related part; and
determining a damaged part in the captured image based on the related part.

A method for identifying a damaged part of a vehicle, comprising the steps of:
acquiring a captured image of the vehicle;
determining a damaged area based on an act of marking damage location in the captured image, thereby forming a marked image; and
sending the marked image to a server, so that the server identifies a damaged part based on a relative positional relationship between the damaged area and feature parts in the marked image.

A method for identifying a damaged part of a vehicle, comprising:
acquiring, by a client, a captured image of the vehicle and sending the captured image to a server;
identifying, by the server, a first damage location in the captured image, and marking the first damage location in the captured image, thereby generating a marked image;
sending, by the server, the marked image to the client;
displaying, by the client, mark information of the first damage location in the marked image;
confirming, by the client, a vehicle damage location based on received interaction, the vehicle damage location including the first damage location;
sending, by the client, an auxiliary damage image of which the vehicle damage location has been confirmed to the server
identifying, by the server, at least one feature part included in the auxiliary damage image, after receiving the auxiliary damage image;

determining, by the server, a relative positional relationship between the feature part and the vehicle damage location in the auxiliary damage image;

matching, by the server, the relative positional relationship in a feature correspondence library to obtain a corresponding related part; and determining, by the server, a damaged part in the captured image based on the related part.

A method for identifying a damaged part of a vehicle, comprising the steps of:

acquiring a captured image uploaded by a client, identifying a first damage location in the captured image, and marking the first damage location in the captured image, thereby generating a marked image;

sending the marked image to the client;

receiving an auxiliary damage image returned from the client, identifying at least one feature parts included in the auxiliary damage image, the auxiliary damage image including image information formed by confirming a vehicle damage location in the marked image based on an interaction;

determining a relative positional relationship between the feature parts and the vehicle damage location in the auxiliary damage image; and matching the relative positional relationship in a feature correspondence library to obtain a corresponding related part, and determining the damaged part in the captured image based on the related part.

A method for identifying a damaged part of a vehicle, comprising the steps of:

acquiring a captured image of the vehicle and sending the captured image to a server;

receiving a marked image returned from the server, the marked image including image information generated by marking an identified first damage location in the captured image;

displaying mark information for marking the first damage location in the marked image;

confirming a vehicle damage location based on received interaction, the vehicle damage location including the first damage location; and sending an auxiliary damage image of which the vehicle damage location has been confirmed to the server.

A method for identifying a damaged part of a vehicle, comprising the steps of:

acquiring a captured image of the vehicle;

determining a damaged area based on an act of marking damage location in the captured image, thereby forming a marked image;

identifying feature parts in the marked image, and determining a relative positional relationship between the feature parts and the damaged area based on the positions of the feature parts and the damaged area in the marked image;

matching the relative positional relationship in a feature correspondence library to obtain a corresponding related part; and determining a damaged part in the captured image based on the related part.

A method for identifying a damaged part of a vehicle, comprising the steps of:

acquiring a captured image of the vehicle, identifying a first damage location in the captured image, and marking the first damage location in the captured image, thereby generating a marked image;

displaying mark information of the first damage location in the marked image;

confirming a vehicle damage location based on received interaction to form an auxiliary damage image, the vehicle damage location including the first damage location;

identifying at least one feature part included in the auxiliary damage image; determining a relative positional relationship between the feature part and the vehicle damage location in the auxiliary damage image; and matching the relative positional relationship in a feature correspondence library to obtain a corresponding related part, and determining the damaged part in the captured image based on the related part.

An apparatus for identifying a damaged part of a vehicle, comprising:

a receiving module for receiving a marked image uploaded by a client, the marked image including a damaged area determined based on an act of marking damage location in a captured image;

a positional relationship determining module for identifying feature parts in the marked image, and determining a relative positional relationship between the feature parts and the damaged area based on the positions of the feature parts and the damaged area in the marked image;

a matching module for matching the relative positional relationship in a feature correspondence library to obtain a corresponding related part; and a part identifying module for determining a damaged part in the captured image based on the related part.

An apparatus for identifying a damaged part of a vehicle, comprising:

an image acquiring module for acquiring a captured image of the vehicle;

a location marking module for determining a damaged area based on an act of marking a damage location in the captured image, to form a marked image;

an image sending module for sending the marked image to a server, to enable said server to identify the damaged part based on a relative positional relationship between the damaged area and feature parts in the marked image.

An apparatus for identifying a damaged part of a vehicle, comprising:

an image marking module for acquiring a captured image uploaded by a client, identifying a first damage location in the captured image, and marking the first damage location in the captured image, thereby generating a marked image;

a mark sending module for sending the marked image to the client;

an auxiliary interacting module for receiving an auxiliary damage image returned from the client, identifying at least one feature part included in the auxiliary damage image, the auxiliary damage image including image information formed by confirming a vehicle damage location in the marked image based on an interaction;

a position determining module for determining a relative positional relationship between the feature part and the vehicle damage location in the auxiliary damage image; and a part identifying module for matching the relative positional relationship in a feature correspondence library to obtain a corresponding related part, and determining the damaged part in the captured image based on the related part.

An apparatus for identifying a damaged part of a vehicle, comprising:

a first image sending module for acquiring a captured image of the vehicle and sending the captured image to a server;

a mark receiving module for receiving a marked image returned from the server, the marked image including image information generated by marking an identified first damage location in the captured image;

a mark displaying module for displaying mark information for marking the first damage location in the marked image;

a damage location confirming module for confirming a vehicle damage location based on received interaction, the vehicle damage location including the first damage location; and a second image sending module for sending an auxiliary damage image of which the vehicle damage location has been confirmed to the server.

A server comprising a processor and a memory for storing instructions which are executable by the processor, wherein upon execution of the instructions, the processor is configured to:

receive a marked image uploaded by a client, the marked image including a damaged area determined based on an act of marking a damage location in a captured image;

identify feature parts in the marked image, and determine a relative positional relationship between the feature parts and the damaged area based on the positions of the feature parts and the damaged area in the marked image;

match the relative positional relationship in a feature correspondence library to obtain a corresponding related part; and determine a damaged part in the captured image based on the related part.

A client comprising a processor and a memory for storing instructions which are executable by the processor, wherein upon execution of the instructions, the processor is configured to:

acquire a captured image of a vehicle;

determine a damaged area based on an act of marking a damage location in the captured image, thereby forming a marked image; and send the marked image to a server, so that the server identifies damaged parts based on a relative positional relationship between the damaged area and the feature parts in the marked image.

A server comprising a processor and a memory for storing instructions which are executable by the processor, wherein upon execution of the instructions, the processor is configured to:

acquire a captured image uploaded by a client, identify a first damage location in the captured image, and mark the first damage location in the captured image, thereby generating a marked image;

send the marked image to the client;

receive an auxiliary damage image returned from the client, identify at least one feature part included in the auxiliary damage image, the auxiliary damage image including image information formed by confirming a vehicle damage location in the marked image based on an interaction;

determine a relative positional relationship between the feature part and the vehicle damage location in the auxiliary damage image; and match the relative positional relationship in a feature correspondence library to obtain a corresponding related part, and determine the damaged part in the captured image based on the related part.

A client comprising a processor and a memory for storing instructions which are executable by the processor, wherein upon execution of the instructions, the processor is configured to:

acquire a captured image of a vehicle and send the captured image to a server;

receive a marked image returned from the server, the marked image including image information generated by marking an identified first damage location in the captured image;

display mark information for marking the first damage location in the marked image;

confirm a vehicle damage location based on received interaction, the vehicle damage location including the first damage location; and send an auxiliary damage image of which the vehicle damage location has been confirmed to the server.

An electronic device comprising a display, a processor and a memory storing instructions which are executable by the processor, wherein upon execution of the instructions, the processor is configured to:

acquire a captured image of a vehicle;

determine a damaged area based on an act of marking a damage location to the captured image on the display, thereby forming a marked image;

identify feature parts in the marked image, and determine a relative positional relationship between the feature parts and the damaged area based on the positions of the feature parts and the damaged area in the marked image;

match the relative positional relationship in a feature correspondence library to obtain a corresponding related part; and determine a damaged part in the captured image based on the related part.

An electronic device comprising a display, a processor and a memory storing instructions which are executable by the processor, wherein upon execution of the instructions, the processor is configured to:

acquire a captured image of a vehicle, identify a first damage location in the captured image, and mark the first damage location in the captured image, thereby generating a marked image;

display, on the display, mark information of the first damage location in the marked image;

confirm a vehicle damage location based on received interaction to form an auxiliary damage image, the vehicle damage location including the first damage location;

identify at least one feature part included in the auxiliary damage image; determine a relative positional relationship between the feature part and the vehicle damage location in the auxiliary damage image; and match the relative positional relationship in a feature correspondence library to obtain a corresponding related part, and determine the damaged part in the captured image based on the related part.

A system for identifying a damaged part of a vehicle comprising a first client and a first server, wherein the first client implements the processing method of any one of the client embodiments in the application scenario in which the damage location is manually marked by the client and identified and processed by the server in the present description, the first server implements the processing method of any one of the server embodiments in the application scenario in which the damage location is manually marked by the client and identified and processed by the server in the present description.

A system for identifying a damaged part of a vehicle comprising a second client and a second server, wherein the second client implements the processing method of any one of the client embodiments in the application scenario in which the client captures an image and the server identifies it preliminarily and returns it to the client for confirmation in the present description, the second server implements the processing method of any one of the server embodiments in the application scenario in which the client captures an image and the server identifies it preliminarily and returns it to the client for confirmation in the present description.

In the method and apparatus for identifying a damaged part of a vehicle, server, client and system as provided in the embodiments of the present description, an identifiable vehicle feature library including a plurality of vehicle parts and a feature correspondence library including relative positional relationships of these vehicle parts can be established in advance. During the procedure of capturing images for loss assessment, the user can manually delineate the damage location at the client. Then, the identifiable vehicle features in the image can be identified, and the relative positions of the identifiable features and the mark delineated by the user are determined according to these identifiable features. This relative position is further matched in the feature correspondence library to determine the damaged part, which enables assisted locating of the damage location by manual and simple operations by the user at the scene, and assists insurance companies in locating damaged parts of vehicle, thereby improving the accuracy and processing efficiency of identifying a damaged part in loss assessment, and greatly improving the user experience.

BRIEF DESCRIPTION OF DRAWINGS

In order to describe the technical solutions in the embodiments of the present description or in the prior art more clearly, the accompanying drawings for the embodiments or the prior art will be briefly introduced in the following. It is apparent that the accompanying drawings described in the following are merely some examples disclosed in this description, and a person of ordinary skill in the art can still derive other drawings from these accompanying drawings without creative efforts.

DESCRIPTION OF EMBODIMENTS

Figure 1:
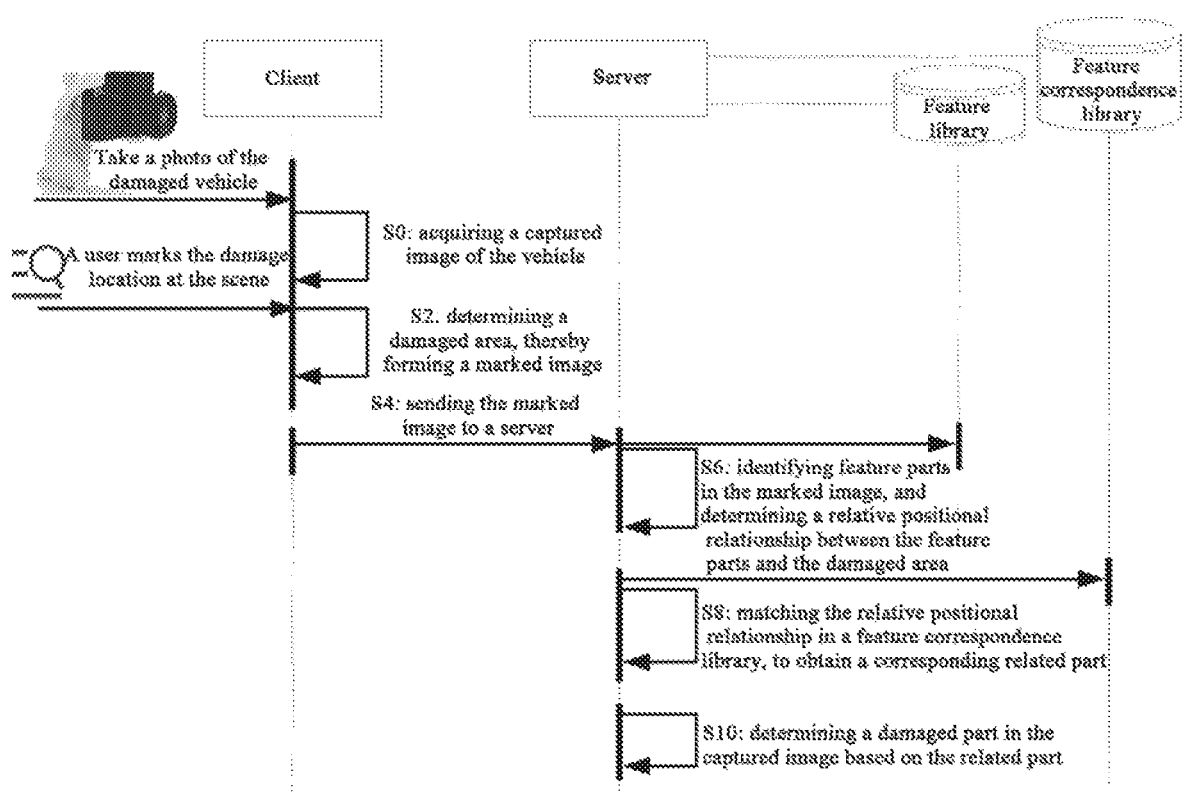
FIG. 1 is a schematic flowchart of a process according to an embodiment of the method described in the present description.

In order to enable those skilled in the art to better understand the technical solutions disclosed in the present description, the technical solutions of the embodiments of the present description will be clearly and completely described in the following with reference to the accompanying drawings in the embodiments of the present description. It is apparent that the embodiments described are merely some, rather than all, of the embodiments of the present description. All other embodiments obtained by those of ordinary skill in h art based on one or more embodiments of the present description without creative efforts should fall within the scope of the embodiments of the present description.

An embodiment provided in the present description can be applied to a client/server system architecture. The client may include a terminal device, such as a smart phone, a tablet, a smart wearable device, a photography equipment, etc., with a capturing function (at least including a photographing function) used by a person at the scene of vehicle damage (may be an owner of accident vehicle or a personnel of insurance company). The client may have a communication module, and may communicate with a remote server to implement data transmission with the server. The server may include a server on the side of insurance company, and in other implementation scenarios, may also include a server on an intermediate platform, such as a server of a third-party car insurance server platform that has a communication link with the server of the insurance company. The server may include a standalone computer device, and may also include a server cluster composed of several servers, or a server structure of a distributed system.

In one or more embodiments of the present description, a feature library and a feature correspondence library may be established in advance. The feature library may be constructed from a plurality of feature parts of the selected vehicle, for example, it may include left/right headlights, number plates, door handles, wheels, rearview mirrors, left/right taillights, and the like. The feature parts of the feature library may include a single part that composes the vehicle, and may also include a set of assemblies being a combination of multiple parts, such as a front door (which may include a door and a door handle). The types of feature part in the feature library described in some embodiments may allow individual part and sets of assemblies to coexist. For example, the fender can be feature parts in the feature library, and the fender assembly can also be feature parts in the feature library. During subsequent identifying process, one or more of these features may be captured from images taken by the user, and used as basis of reference for judging the relative position of the marked damage location on the vehicle.

At the same time, a feature correspondence library may be established, and the feature correspondence library may include data for positional relationship between vehicle parts, which are established according to the spatial positions between vehicle parts. In some embodiments of the present description, the feature correspondence library may be established based on the aforementioned feature library. Specifically, the feature parts contained in the feature library may be used as a reference to establish a correspondence therebetween. The correspondence may include a correspondence between two vehicle parts, for example, the related part between vehicle parts A and B is P1; it may also include a correspondence between three or more vehicle parts, for example, the related part in the area between vehicle parts A, B and C is P2; or, it may also include a correspondence between a vehicle part and multiple vehicle parts, for example, the related part at the location of 80% of the distance from vehicle parts A to E, and 40% of the distance from vehicle parts A to F is P3. In a specific embodiment of the present description, a specific positional relationship data in the feature correspondence library may include a variety of correspondences characterizing: a related part to which an area between vehicle parts pertains, a related part to which the area in a specified direction of a vehicle part pertains, and a related part to which an area of specified proportion between vehicle parts pertains. Of course, in some embodiments, a part may have different correspondences with respect to different reference parts.

For instance, in a specific example, the feature library may include two headlights, front/rear door handles, wheel hubs, and other feature parts, then the positional relationship data for the feature parts established in the feature correspondence library may include the following types:

There is a "front bumper" between the two headlights;

There is a "rear door" between two door handles;

or, in the area between the feature parts "front door handle" and "wheel hub", a "front fender" is located at 20%-60% of the distance from the "wheel hub", and a "front door" is located at 0-40% of the distance from the "front door handle";

or, a "front face air inlet grille" is located at 20%-80% of the distance between the two "headlights", and so on.

These feature parts and the data about the positional relationships therebetween can be stored in the corresponding feature library and feature correspondence library in a certain data format.

Hereinafter, an embodiment of the present description will be described by taking a specific application scenario as an example. Specifically. FIG. 1 is a schematic flowchart of an embodiment of the method for identifying a damaged part of a vehicle provided in the present description. Although the present description provides method operation steps or an apparatus structure shown in the following embodiment or the accompanying drawings, the method or apparatus can include, based on conventional or non-inventive effort, more operation steps or module units, or fewer operation steps or module units after combining some operation steps or module units. For those steps or structures which are not logically causal, the execution order of these steps or the module structure of the apparatus is not limited to the execution order or the module structure shown in the embodiments of the present description or the accompanying drawings. When used in an actual apparatus, server, or terminal product, the method or module structure can be executed in a sequence based on the method or module structure shown in the embodiment or the accompanying drawings, or can be executed in parallel (for example, in an environment of parallel processors or multi-thread processing, or even in an implementation environment of distributed processing and server clustering).

This embodiment is exemplified in an application scenario of on-site user-assisted loss assessment in which a user uses a mobile phone to take a photo of vehicle damage at the scene and sends the captured image to an insurance company for a vehicle loss assessment. In this example application scenario, the client can be a smartphone used by the user. In the event of a vehicle accident, the user can use the smartphone having a corresponding loss assessment application installed thereon to capture the damage of the vehicle. During capturing, the user can manually delineate the damaged area in the captured image, and then send the captured image to the car insurance company. The server at the auto insurance company can identify the feature parts in the captured image and the area delineated by the user where parts are damaged, after reading the captured image. The server can obtain a related part corresponding to a relative positional relationship between the area delineated by the user and the feature parts by matching the relative positional relationship in the feature correspondence library, and the damaged part can be identified. In this way, the image uploaded by the user to the server can no longer contain image information of the vehicle damage scene only, and can also contain information about the area of the damaged part manually marked by the user, so as to achieve the purpose of on-site user-assisted damaged part identification and fast loss assessment. Of course, the description of the following embodiments does not limit other technical solutions that can be extended based on the present description. For example, in other implementation scenarios, the embodiments provided in the present description can also be applied to the implementation scenarios in which interactions with users to implement on-site vehicle loss assessment are provided by a third-party service platform, or an on-site dedicated device can be formed with integrated feature library and feature correspondence library, to identify the damaged part immediately while taking photos at the scene of vehicle damage or further complete the vehicle loss assessment. Specifically, as shown in FIG. 1, in an embodiment of the data processing method for web page access as provided in the present description, the method may include the following steps:

S0: acquiring, by a client, a captured image of the vehicle;

S2: determining, by the client, a damaged area based on an act of marking a damage location in the captured image, thereby forming a marked image;

S4: sending, by the client, the marked image to a server;

S6: identifying, by the server, feature parts in the marked image, and determining a relative positional relationship between the feature parts and the damaged area;

S8: matching, by the server, the relative positional relationship in a feature correspondence library to obtain a corresponding related part; and S10: determining, by the server, a damaged part in the captured image based on the related part.

The feature parts may be parts in a pre-constructed feature library. As mentioned above, the feature library may store a plurality of identifiable vehicle parts. A user at the scene of vehicle damage can take a photo of the vehicle using the client. In taking the photo, the user may be required to take the photo according to certain capturing requirements, so that the captured image acquired by the client may include at least one identifiable feature part for subsequent determination of the relative positional relationship between the feature part and the area delineated by the user. The feature parts described in one embodiment of the present description may include: vehicle parts included in the constructed feature library.

Correspondingly, in this embodiment, the feature correspondence library may include: part positional relationship data constructed using the vehicle parts in the feature library as a reference, the part positional relationship data including the relationship data characterizing at least one of a related part to which an area between vehicle parts pertains, a related part to which the area in a specified direction of a vehicle part pertains, and a related part to which an area of specified proportion between vehicle parts pertains.

In one or more embodiments of the present description, the feature library and the feature correspondence library may be stored on a computer storage medium on the server side. In other embodiments, one or both of the feature library and the feature correspondence library may be stored on a separate database server or storage device, etc., which may be queried by the insurance company in identifying feature parts in a captured image or in mapping the relative positional relationship.

Figure 2:
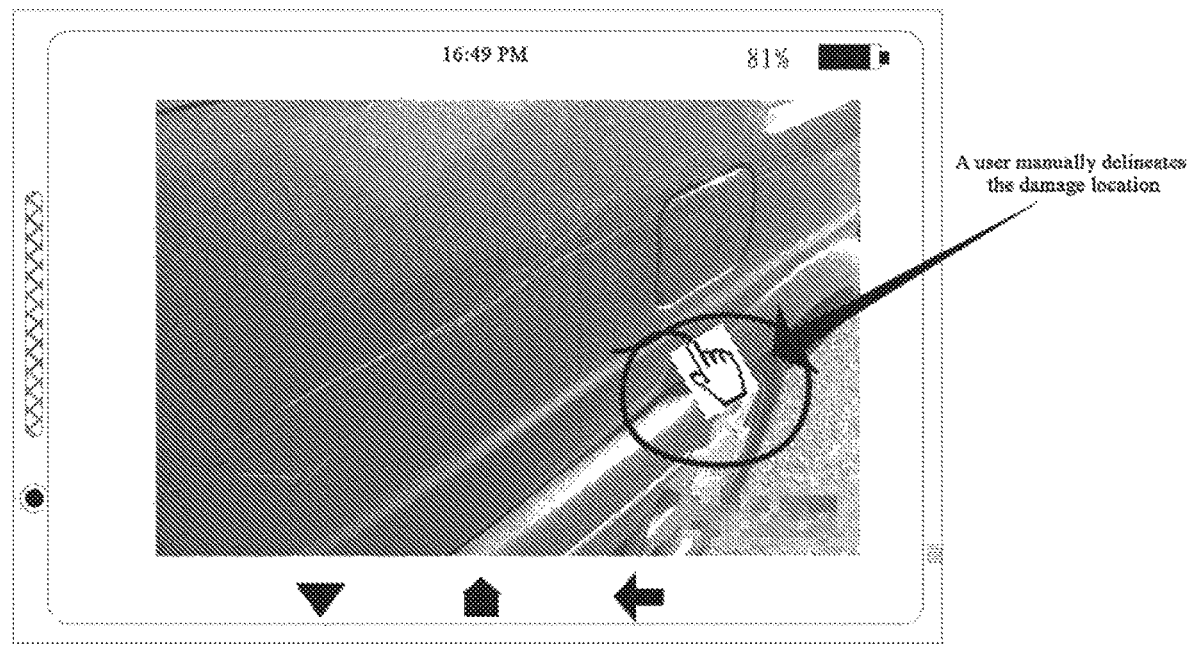
FIG. 2 is a schematic diagram of a user manually marking a damage location at a client at the scene in an implementation scenario of the present description.

After capturing the image as required, the user can manually mark the damage location on the image captured by the client, and the client can determine an extent of damaged area based on the damage location. The specific act of marking may include a user sliding a finger on the touch screen of the client to delineate the damage location in the captured image. Of course, the user may also mark the damage location on the client using a mouse, a magnetic/optical sensing pen, and the like. The damaged area determined based on the user's on-site damage location mark can be an irregularly shaped damaged area delineated by the user, or a regular shaped damaged area after correction, such as a rectangular damaged area. FIG. 2 is a schematic diagram of a user manually marking a damage location on a client at the scene in an implementation scenario of the present description.

After the user marks the damage location on the captured image, the captured image at this time may be referred to as a marked image. The client can send the marked image to a remote server of the car insurance company for processing. At this time, the image uploaded by the user to the server is no longer a simple image of the vehicle damage scene, but is accompanied by information such as the damage location marked by the user, so as to achieve the purpose of on-site user-assisted damaged part identification and thus fast loss assessment for vehicle at the scene.

After receiving the marked image, the server can read the image information to identify the feature part in the marked image and the damaged area marked by the user. A relative positional relationship between the feature part and the damaged area may then be determined based on the position of the feature part and the damaged area in the marked image. The relative positional relationship described herein may include one of the data for relationship between the feature part and the damaged area in terms of direction, in terms of distance, and in terms of distance percentage, etc., or a combination thereof in a specific example, if the damaged area P1 is on the right side of the identified feature part A, the relative positional relationship that can be determined is "the target object is to the right of the feature part A". Alternatively, other specific information, such as "the target object is in the range of 10-40 cm directly to the right of the feature part A", may be obtained by incorporating some image algorithms.

The relative positional relationship may be determined by using an algorithm for image pixels or by means of other image processing methods. In an embodiment provided in the present description, a two-dimensional or three-dimensional coordinate system may be established in the marked image, and position coordinates of the feature parts and the damaged area are derived respectively, then a relative positional relationship therebetween is calculated. In this way, the relative positional relationship can be determined more quickly and accurately based on the coordinate system. Specifically, in an embodiment of the method, determining the relative positional relationship between the feature parts and the damaged area may include:

S80: constructing a coordinate system using the center point of the damaged area as an origin;

S82: determining position coordinate data of the feature parts in the coordinate system, respectively; and S84: determining the relative positional relationship between the feature parts and the damaged area based on the position coordinate data of the feature parts.

In the application scenario of this embodiment, the constructed coordinate system may be a two-dimensional coordinate system, where the center point of the damaged area is adopted as an origin. However, the present description does not exclude other embodiments, in which a three-dimensional coordinate system can be constructed, and the relative positional relationship can be calculated in a manner more similar to the actual part's spatial geometry. Alternatively, in other embodiments, because of mutual reference of objects, it is also possible to construct a two-dimensional or three-dimensional coordinate system by using an identified certain damaged part as an origin, and even a dual coordinate system may be constructed for determining the relative positional relationship between the feature parts and the damaged area.

In some embodiments, the captured image may include one feature part. For example, when a photo is taken at the scene of vehicle damage, the user can send the captured image to the server in real time. If the server identifies at least one feature part in the uploaded image, it can be considered that the image captured by the user meets the requirements and can be used for assisted vehicle damage identification. Generally, in a practical application, if it is set up that one feature part can be used for locating a damaged part once it is identified, the user of the client is usually instructed to take photos according to certain access requirements, or to take some other auxiliary measures at the scene. In another embodiment of the method as provided in the present description, it may be set up that two or three feature parts should be used, and then positional relationships between the feature parts and the damaged area can be determined in conjunction with the position of the damaged area, and then the relationships are matched in the feature correspondence library, so as to achieve fast assisted locating and damaged part identification. Specifically, in another embodiment of the method described in the present description, S800: selecting, if it is identified that the number N of the feature parts in the marked image is greater than 3, K feature parts from the N feature parts to determine the relative positional relationship between the damaged area and the K feature reference parts, wherein 2≤K≤3.

In a specific implementation of an embodiment of the present description, the position direction of feature parts with respect to the damaged area may be marked by a vector, and then the spatial angle is identified based on the relative size of the areas of multiple feature parts, and in conjunction with the coordinate distance, it can be determined that the scope of which one or more feature parts is better matched by the damaged area. For example, the damaged area occupies the area of multiple feature parts at the same time, but most of the area are between the feature parts A and B, which may indicate that the damaged part is more likely to pertain to vehicle parts within the scope between the feature parts A and B. In this way, the damage location can be determined more accurately based on the determination of positional relationship of the occupied area. Specifically, in another embodiment of the method as described in the present description, determining the relative positional relationship between the feature parts and the damaged area based on the position coordinate data of the feature parts may include:

S840: transforming the damaged area into a corresponding first regular geometric figure according to the shape of the damaged area;

S842: constructing, in the coordinate system, a second regular geometric figures including an origin and position coordinate data of at least two feature parts;

S844: calculating the proportion of the area of the first regular geometric figure included in the second regular geometric figures, respectively;

S846: determining a scope information on scope of the damaged area between the feature parts based on the area proportion of the first regular geometric figure and the coordinate distances of the feature parts; and S848: determining the relative positional relationship between the feature parts and the damaged area based on the matching of the scope information.

Figure 3:
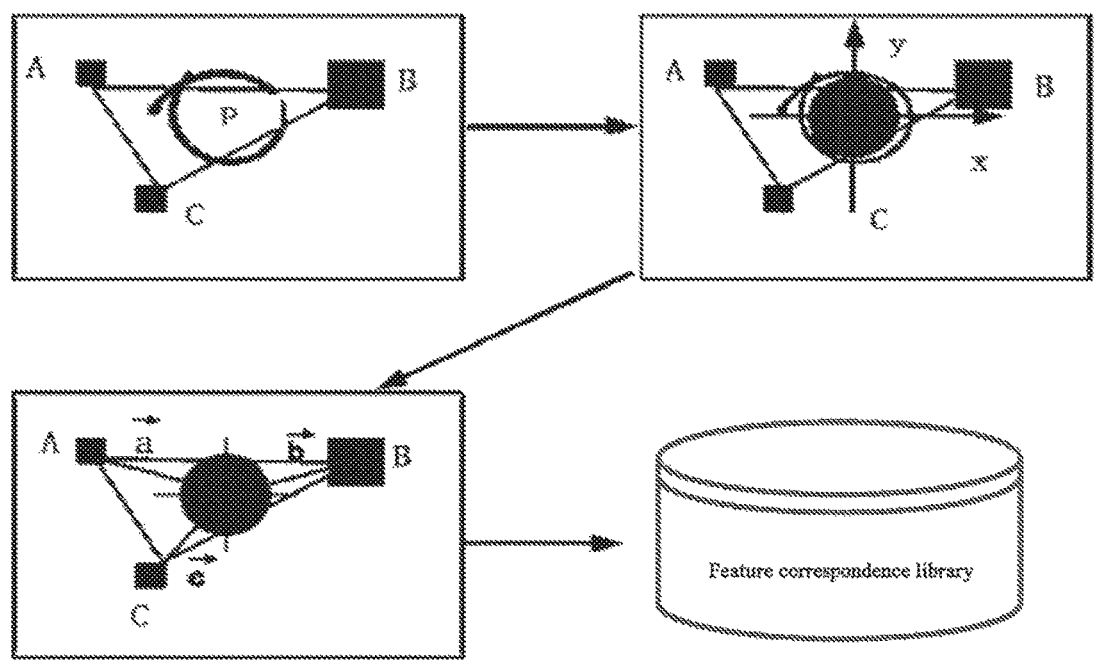
FIG. 3 is a schematic diagram of a procedure of determining a relative positional relationship between feature parts and a damaged area in an implementation scenario of the present description.

Said regular geometric figures generally refer to various figures abstracted from real objects, such as squares, rectangles, triangles, rhombuses, trapezoids, circles, fans, and rings. Generally, the coverage of the damaged area manually marked by the user on the client is an irregular figure, and in this embodiment, it can be transformed into a corresponding regular geometric figure (which may be referred to as a first regular geometric figure) according to the track marked by the user. For example, as shown in FIG. 3, an irregular circle can be transformed into a regular circle. Specifically, the parameters in the first regular geometric figure, such as radius and side length, can be adaptively set according to the track delineated by the user or processing requirements. In this embodiment, the center point of the damaged area is located at an origin, and the lines connecting other feature parts and the origin may constitute corresponding geometric figures (herein referred to as second regular geometric figures). In this way, the damaged area can occupy certain areas in the second regular geometric figures formed by other parts. The larger the occupied area is, the more likely the damaged area pertains to a vehicle part within the scope between certain two or more feature parts. Therefore, in this embodiment, the damage location can be determined more accurately based on the determination of positional relationship of the occupied area.

FIG. 3 is a schematic diagram of a procedure of determining a relative positional relationship between feature parts and a damaged area in an implementation scenario of the present description. In FIG. 3, the circular track P in the middle is the damaged area manually marked by the user at the scene using the client, and A, B, and C are feature parts in the feature library that are respectively identified from the marked image. Then, a two-dimensional coordinate system (x, y) is established using the center point of the irregular figure P manually delineated by the user as an origin. Further, the displacement vectors a, b, and c from the positions of the center points of the feature parts A, B, and C to the origin, respectively. Then, the displacement vectors a, b, and c can be input into the feature correspondence library for queries of matching, to determine the related part corresponding to these displacement vectors in the feature correspondence library. The determined related part can be used as the damaged part identified in the captured image acquired by the client.

In this embodiment, when multiple (more than 3) feature parts are identified from the marked image, only two or three of them can be used to determine the relative positional relationship with the damaged area. In this way, it is possible to reduce the information interference (or influence, or even contradiction) between multiple (generally more than 3) positional relationships due to the generation of a large number of positional relationships caused by the large number of feature parts involved in the calculation, which can effectively balance the accuracy of damaged part identification and the efficiency of matching query in the feature correspondence library. Of course, based on this, when establishing or maintaining the positional relationship between each vehicle part set in the feature correspondence library, it can also be described using the positional relationship between two or three parts and a target object, thereby reducing the amount of data storage for positional relationship data in the feature correspondence library, and improving the query efficiency.

In another embodiment, if the server fails to find the data information matching the relative positional relationship in the feature correspondence library, at this time, it is possible to select the correspondence having the highest matching degree with the relative positional relationship to identify and confirm the damaged part. Specifically, in another embodiment of the method, it is possible to acquire, if no positional relationship data matching the relative positional relationship is found in the feature correspondence library, positional relationship data having the highest matching degree with the relative positional relationship;

The related part corresponding to the positional relationship data having the highest matching degree is used as the related part that matches the relative positional relationship.

The processing of the matching degree can be confirmed according to the semantic information expressed in the relative positional relationship. For example, the two relative positional relationships of "the right side of the left headlight" and "the left side of the right headlight" can be matched with "20%-80% of the area between the two headlights is a front face air inlet grille", which has the highest matching degree in the feature correspondence library. Alternatively, in another example, the derived relative positional relationship is "the area near 20%-50% of the wheel hub", then the feature correspondence that may have the highest matching degree therewith in the feature correspondence library is: in the area between the feature parts "front door handle" and "wheel hub", the area near 20%-60% of the wheel hub is located at "front fender", and the feature correspondence having the second highest matching degree is: the area near 0-40% of the "front door handle" is located at "front door".

In the implementation provided by this embodiment, the feature library and the feature correspondence library may be partially or entirely stored on the server side, so that the database storage and query, matching, and other processing on the client can be minimized. The client can capture images according to the requirements and send the images to the server. Then the server, which is more powerful, can identify the feature parts and determine the relative positional relationship, and query in the corresponding database to identify which part is damaged.

In one or more embodiments of the present description, the feature library or feature correspondence library may be pre-established offline, and vehicle parts may be selected in advance to build the feature library. When the feature library is updated, the feature correspondence library is updated accordingly, which are then available online after update/maintenance. The present description does not exclude the way in which the feature library or feature correspondence library is built or updated/maintained online. With sufficient computer capabilities, the feature library or correspondence library can be established online, and the data information in the established database can be used online synchronously, for feature identification on captured images or processing of matching query for relative positional relationships.

In a method for identifying a damaged part of a vehicle provided by the foregoing embodiments in the present description, an identifiable vehicle feature library including a plurality of vehicle parts and a feature correspondence library including relative positional relationships of these vehicle parts can be pre-established. During the loss assessment image capturing procedure, the user can manually delineate the damage location on the client. Then, the identifiable vehicle features in the image can be identified, and the relative positions of the identifiable features and the mark delineated by the user are determined according to these identifiable features. This relative position is further matched in the feature correspondence library to determine the damaged part, which enables assisted locating of the damage location by manual and simple operations by the user at the scene, and assists insurance companies in locating damaged parts of vehicle, thereby improving the accuracy and processing efficiency of identifying a damaged part in loss assessment, and greatly improving the user experience.

Figure 4:
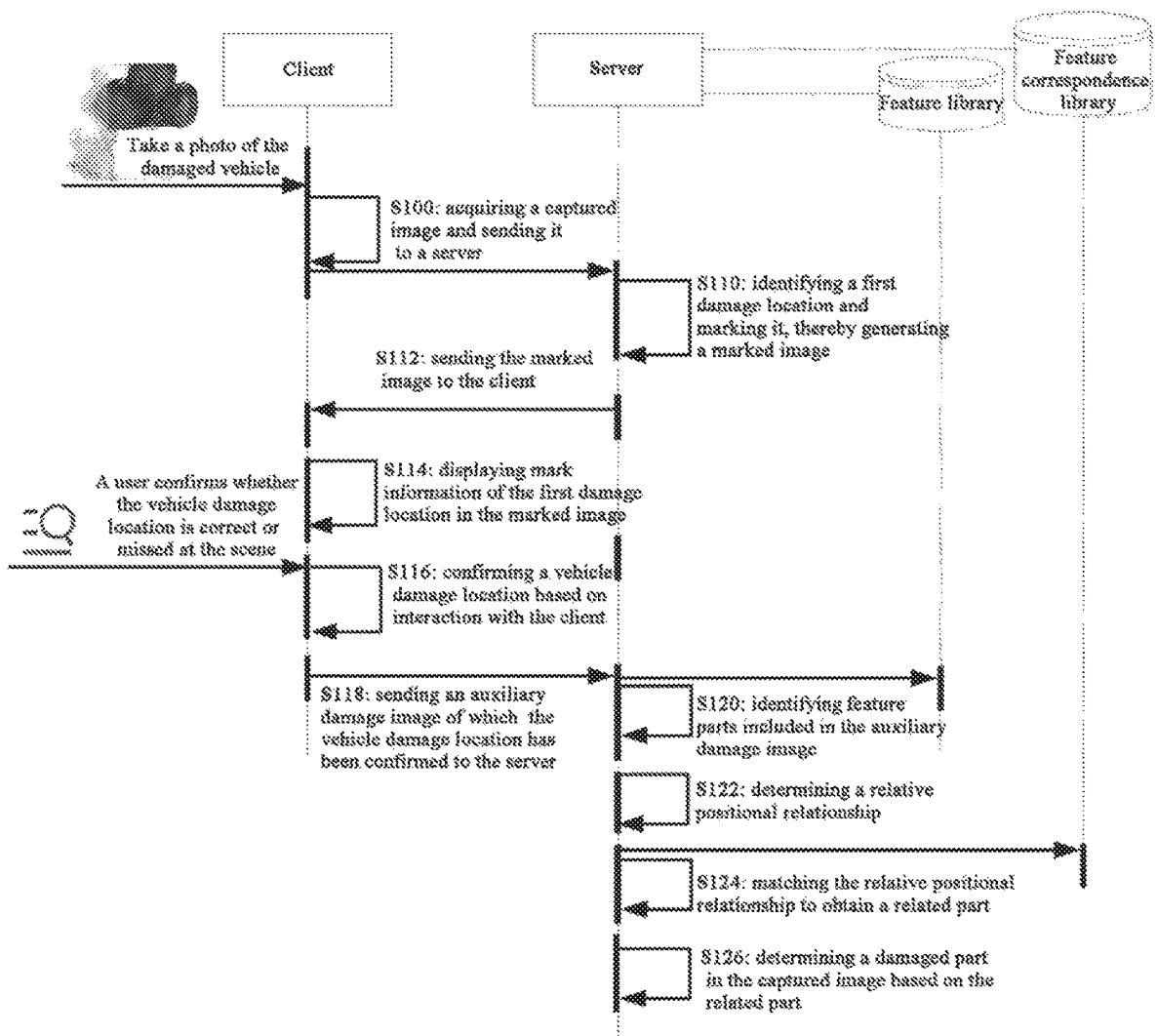
FIG. 4 is a schematic flowchart of a method according to another embodiment of the method provided in the present description.

In the above embodiment, once a user captures an image at the scene of vehicle damage, he or she can manually delineate the damage location, then upload it to the server, which, in turn, decides the damaged part. In one or more other embodiments of the present description, another method for identifying a damaged part of a vehicle is also provided, in other embodiments, the user may send the original captured image to the server while capturing the image, and the damage location is preliminarily identified on the server side automatically, which is then marked and transmitted to the client user for confirmation. If the damage location marked by the server is correct (in some embodiments, it can be expressed as "deemed to be valid"), the user can directly confirm and submit it to the system for matching the positional relationship, thereby confirming the damaged part. If the mark delineated by the server is incorrect (in some embodiments, it can be expressed as "deemed to be invalid"), the user can make adjustments quickly according to the actual situation at the scene, such as expanding the marked area, moving the marked area, and so on. In this way, in other embodiments of the present description, the damaged area can also be quickly confirmed according to the manual assistance by the user at the scene, and then the damaged part can be matched and confirmed based on the positional relationship between the feature parts identified by the system and the damaged area. Taking advantage of the user being closer to the actual vehicle damage situation at the scene of vehicle damage, the accuracy of the damaged part identification and the user experience on loss assessment can be effectively improved. Specifically, as shown in FIG. 4, in another embodiment of the method provided in the present description, the method may include:

S100: acquiring, by a client, a captured image of the vehicle and sending the captured image to a server;

S110: identifying, by the server, a first damage location in the captured image, and marking the first damage location in the captured image, thereby generating a marked image;

S112: sending, by the server, the marked image to the client;

S114: displaying, by the client, mark information of the first damage location in the marked image;

S116: confirming, by the client, a vehicle damage location based on received interaction, the vehicle damage location including the first damage location;

S118: sending, by the client, an auxiliary damage image of which the vehicle damage location has been confirmed to the server;

S120: identifying, by the server, at least one feature part included in the auxiliary damage image, after receiving the auxiliary damage image;

S122: determining, by the server, a relative positional relationship between the feature part and the vehicle damage location in the auxiliary damage image;

S124: matching, by the server, the relative positional relationship in a feature correspondence library to obtain a corresponding related part; and

S126: determining, by the server, the damaged part in the captured image based on the related part.

In this embodiment, a person at the scene of vehicle damage may use a client to take a photo of the damaged vehicle. It should be noted that when taking photos, one or more photos may be obtained, and a video may also be captured. In some embodiments of the present description, the video may be considered as a continuous image, and the photo or video can be considered as a type of captured images. The captured image can be sent to the server by the client.

The server can identify the captured image uploaded by the client using a damage identification system constructed in advance or in real time. The damage identification system may include a damage identification algorithm constructed by training with various training models, such as Re-Net and Convolutional Neural Network. In a specific example, an algorithm model for damage identification in an image can be constructed based on a Convolutional Neural Network (CNN) and a Region Proposal Network (RPN), combined with a pooling layer, a fully connected layer, and the like. After acquiring the captured image, the server can use the algorithm model to identify the captured image, and preliminarily identify the damage location of the vehicle in the captured image (which may be referred to as a first damage location). The server may mark the identified damage location in the captured image. For example, a rectangular frame may be used to delineate the first damage location identified by the server. For ease of description in this embodiment, a captured image with the marked first damage location among the captured images may be referred to as a marked image. The server returns the generated marked image to the client side.

After receiving the marked image, the client may display the mark information of the first damage location in the marked image, for example, the client may display the rectangular frame mark where the first damage location is located in the marked image as described in the above example. In this way, the user can see the damage location of the vehicle in the image preliminarily identified by the server on the client, and then the user can confirm whether the vehicle damage location identified by the server is valid according to the actual situation at the scene, so as to achieve the purpose of on-site user-assisted damaged part identification.

In an embodiment of the present description, confirming the vehicle damage location may include:

confirming whether the mark position of the first damage location in the marked image displayed by the client is correct; and if not, adjusting the mark information of the first damage location based on the received interaction.

Adjusting the mark information of the first damage location may include adjusting the position of the mark information in the marked image in some implementation scenarios, and may also include adjusting the size or shape of the mark information. The user can adjust the corresponding displacement of the mark information of the first damage location or other parameters according to the actual vehicle damage situation at the scene.

Figure 5:
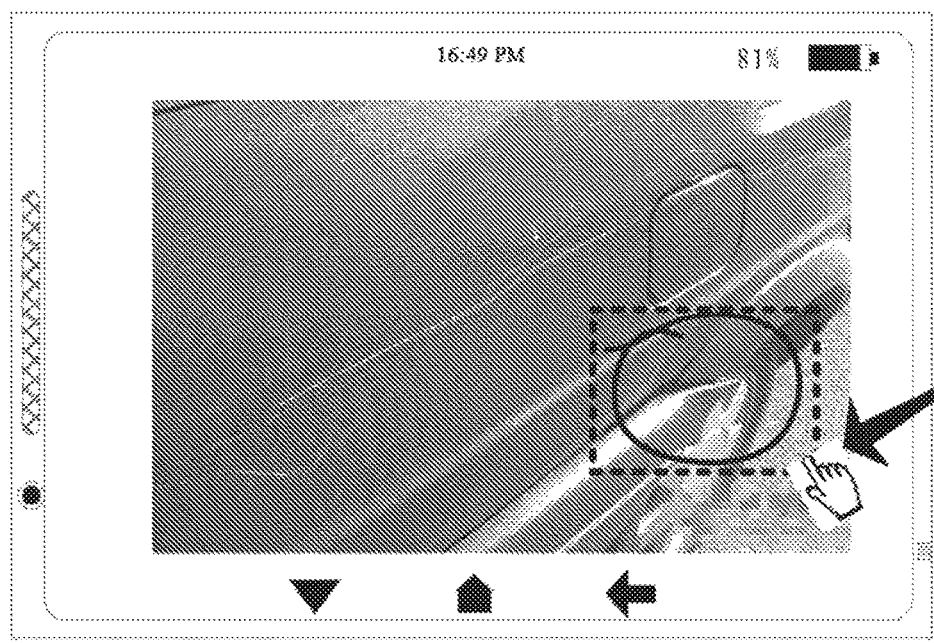
FIG. 5 is a schematic diagram of a scenario where a user adjusts a first damage location identified by a server at the scene in an embodiment of the present description.

FIG. 5 is a schematic diagram of a scenario where a user adjusts a first damage location identified by a server at the scene in an embodiment. The client can display the rectangular mark frame of the first damage location identified by the server in real time. The user can adjust the position or size of the rectangular mark frame on the client by sliding or dragging with a finger or a mouse, etc., so that the position of the rectangular mark frame becomes more consistent with the actual vehicle damage location observed by the user at the scene, or the rectangular mark frame can completely cover the vehicle damage location observed by the user at the scene.

In another embodiment, the user may also manually mark other vehicle damage locations through the client. In some implementation scenarios, the user sends an image to the server after capturing the image according to the prompts. Due to capturing angles, light, the server's own identification algorithm, etc., the server may not fully identify all vehicle damage locations in the captured image. For example, there are two damage locations A and B in the image captured by the user, but the server identifies the damage location A only. Because the user is at the scene of vehicle damage, when the client only displays the damage location A identified by the server, the user can know that the missed damage location B has not been identified. At this time, the user can manually mark the damage location B on the client. In this way, it is possible to assist in confirming the damage location in the image in combination with the actual observation of the user at the scene of vehicle damage, which greatly improves the accuracy of the damaged part identification. Specifically, in another embodiment of the method as provided in the present description, confirming the vehicle damage location based on the received interaction includes:

S1160: confirming mark information of a second damage location based on a received interaction instruction, the second damage location including a new vehicle damage location added to the marked image.

Of course, the vehicle damage location confirmed at this time may include the second damage location. In one or more embodiments of the present description, confirming the vehicle damage location may include adjusting and confirming the first damage location, and may also include a process of adding the second damage location. It should be noted that in the process of confirming the vehicle damage location, even if the first damage location is not actually adjusted, the process of confirming the first damage location, such as confirming that the first damage location is correct or submitting the first damage location, etc., pertains to the process of confirming the vehicle damage location. The second damage location is the same as above. When the user adjusts the first damage location or does not adjust the first damage location and also confirms that there is no missed second damage location, the current image information can be submitted to confirm the information on each vehicle damage location in the image. At this time, the marked image after confirming the vehicle damage location may be referred to as an auxiliary damage image, and the client may send the auxiliary damage image to the server by triggering "submit".

The subsequent processing after the server of the insurance company or third-party loss assessment service provider receives the auxiliary damage image may be referred to the aforementioned processing method in which a damaged part in the image are identified based on the positional relationship between vehicle parts. Specifically, for example, the server may be provided with a feature library and a feature correspondence library. The server can identify the feature parts in the feature library which are included in the auxiliary damage image. Of course, in order to determine the relative positional relationship with the damaged area, generally, at least one feature part can be identified. The auxiliary damage image already includes at least one of the identified first damage location and the second damage location, and the vehicle damage locations of the first damage location and the second damage location included in the auxiliary damage image may be used as the damaged area, to calculate the relative positional relationship between the feature parts and the vehicle damage location in these auxiliary damage images. Further, the relative positional relationship may be matched with a positional relationship in the feature correspondence library, to obtain a related part in the feature correspondence library that matches the relative positional relationship, and then the matched related part may be used as the damaged part identified in the captured image.

The specific processing methods for identifying the feature parts, determining the relative positional relationship, and matching the relative positional relationship may be referred to the aforementioned description of the related method embodiment in which the user delineates the damaged area manually, and according to the description of foregoing method embodiments, the embodiment in the present description in which the damage location is firstly identified by the server and then confirmed by the client may also include more other embodiments, which are not described in detail here.

Of course, the above embodiments, in combination with the vehicle loss assessment process, may further be provided that after the damaged part is determined, the client user is instructed to take a detailed photo of the damaged part for the subsequent precise processing of loss assessment, forming a maintenance plan, and quoting, etc. Alternatively, after identifying the damaged part, the server sends the information about the identified damaged parts to a designated server for further processing, including loss assessment, re-identification, storing, and the like.

In another method for identifying a damaged part of a vehicle provided by the foregoing embodiments in the present description, the user may send the original captured image to the server while the image is captured, and the damage location is preliminarily identified on the server side automatically, which is then marked and transmitted to the user of the client for confirmation. If the damage location marked by the server is correct, the user can directly confirm and submit it to the system for matching the positional relationship, thereby confirming the damaged part. If the mark delineated by the server is incorrect, the user can make adjustments quickly according to the actual situation at the scene, or add a missing damage location, etc. In this way, the damaged area can be quickly confirmed according to the manual assistance by the user at the scene, and then the damaged part can be matched and confirmed based on the positional relationship between the feature parts identified by the system and the damaged area. Taking advantage of the user being closer to the actual vehicle damage situation at the scene of vehicle damage, the accuracy of the damaged part identification and the user experience on loss assessment can be effectively improved, assisting insurance companies in locating damaged parts of vehicle, improving the accuracy and processing efficiency of identifying a damaged part in loss assessment, and greatly improving the user experience.

Figure 6:
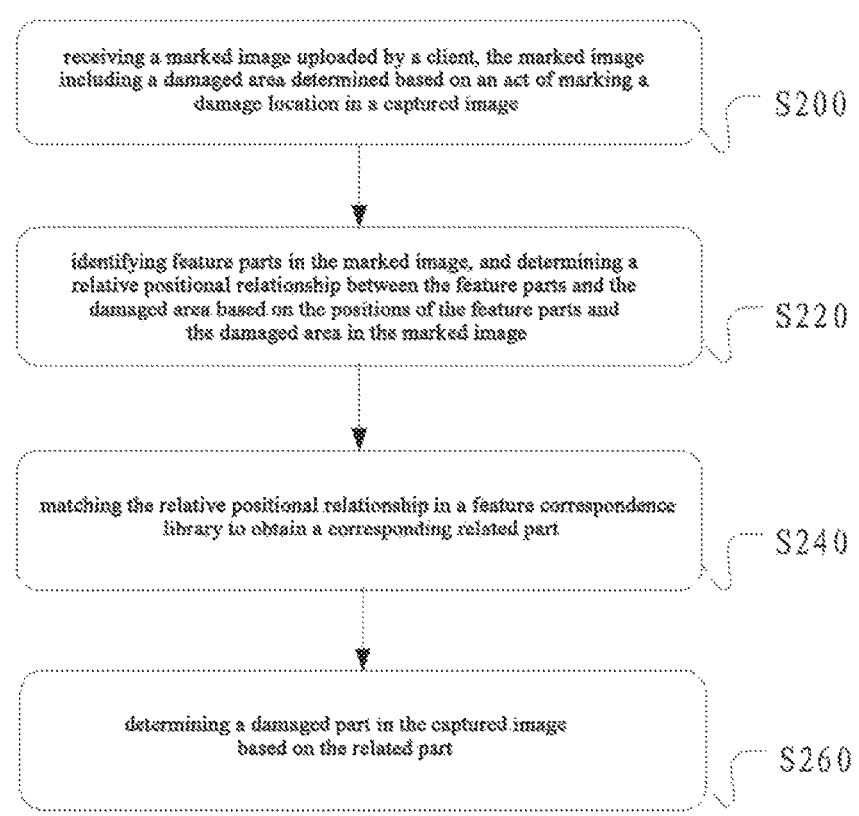
FIG. 6 is a schematic flowchart of a method for identifying a damaged part of a vehicle for a server provided in the present description.

The above embodiments describe multiple embodiments of the method for identifying a damaged part of a vehicle in the present description from the perspective of a client-server interaction. Based on the foregoing description of the embodiment in which the client interacts with the server, the present description may also provide an embodiment of a method for identifying a damaged part of a vehicle that can be used by the server. Specifically, in an embodiment as shown in FIG. 6, the method may include:

S200: receiving a marked image uploaded by a client, the marked image including a damaged area determined based on an act of marking a damage location in a captured image;

S220: identifying a feature part in the marked image, and determining a relative positional relationship between the feature part and the damaged area based on the position of the feature part and the damaged area in the marked image;

S240: matching the relative positional relationship in a feature correspondence library to obtain a corresponding related part; and S260: determining the damaged part in the captured image based on the related part.

In one embodiment, a feature library and a feature correspondence library may be pre-established on the server side. Specifically, the feature part may include: vehicle parts included in the established feature library, Correspondingly, the feature correspondence library includes: part positional relationship data constructed using the vehicle parts in the feature library as a reference, the part positional relationship data including the relationship data characterizes at least one of a related part to which an area between vehicle parts pertains, a related part to which the area in a specified direction of a vehicle part pertains, and a related part to which an area of specified proportion between vehicle parts pertains.

Of course, in other embodiments, the feature library and the correspondence library can also be constructed and used online in real time. Alternatively, at least one of the feature library and the correspondence library is data information stored in a database on another server or memory.

In another embodiment of the method, the specific processing performed by the server in determining the relative positional relationship between the feature part and the damaged area may include:

S222: constructing a coordinate system using the center point of the damaged area as an origin;

S224: determining position coordinate data of the feature part in the coordinate system, respectively; and S226: determining the relative positional relationship between the feature part and the damaged area based on the position coordinate data of the feature part.

In another embodiment, when the server identifies that the number of feature parts in the marked image is greater than a certain threshold, a specified number of feature parts thereamong may be selected to calculate the relative positional relationship. In this way, the complexity of the relative positional relationships between parts can be reduced, such that the matching can be performed quickly, and the processing efficiency can be improved. Specifically, in another embodiment of the method, S228: selecting, if it is identified that the number N of the feature parts in the marked image is greater than 3, K feature parts from the N feature parts to determine the relative positional relationship between the damaged area and the K feature reference parts, wherein $2 \leq K \leq 3$.

In another embodiment of the method as provided in the present description, the relative positional relationship may be determined according to the size of the area between the feature part occupied by the damaged area delineated by the user. Specifically, in another embodiment of the method, determining, by the server, the relative positional relationship between the feature parts and the damaged area based on the position coordinate data of the feature parts may include:

S2280: transforming the damaged area into a corresponding first regular geometric figure according to the shape of the damaged area;

S2282: constructing, in the coordinate system, second regular geometric figures including an origin and position coordinate data of at least two feature parts;

S2284: calculating size of feature area of the first regular geometric figure included in the second regular geometric figures, respectively;

S2286: determining a scope information on scope of the damaged area between the feature parts based on the sizes of the feature areas and the coordinate distances of the feature parts; and S2288: determining the relative positional relationship between the feature parts and the damaged area based on the matching of the scope information.

In another embodiment, if no positional relationship data matching the relative positional relationship is found in the feature correspondence library, the server acquires positional relationship data having the highest matching degree with the relative positional relationship;

The related part corresponding to the positional relationship data having the highest matching degree is used as the related part that matches the relative positional relationship.

Figure 7:
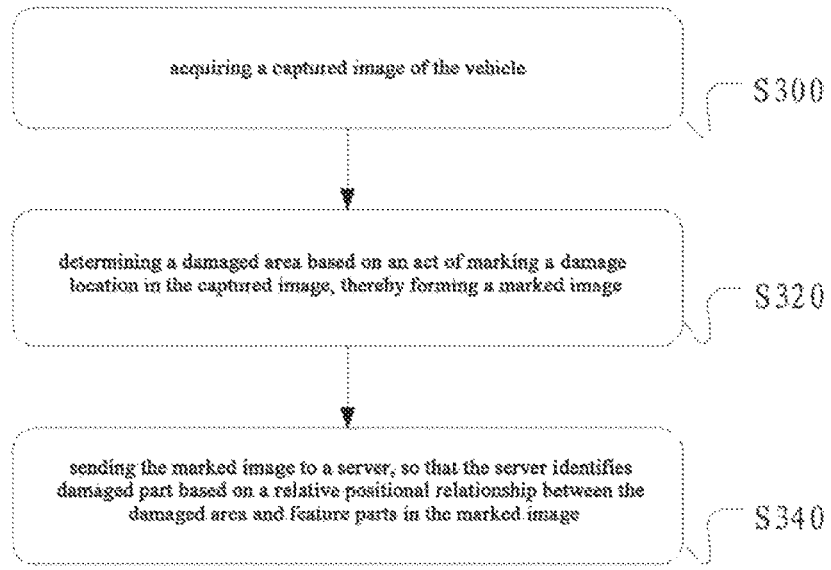
FIG. 7 is a schematic flowchart of a method for identifying a damaged part of a vehicle for a client provided in the present description.

The above embodiment of the method for identifying a damaged part of a vehicle that can be used on the server side may be specifically referred to the description of the foregoing embodiment related to the client-server interaction. Of course, based on the foregoing description of the embodiment in which the client interacts with the server, the present description may also provide an embodiment of a method for identifying a damaged part of a vehicle that can be used on the client side. Specifically, in an embodiment shown in FIG. 7, the method may include:

S300: acquiring a captured image of the vehicle;

S320: determining a damaged area based on an act of marking a damage location in the captured image, thereby forming a marked image; and S340: sending the marked image to a server, so that the server identifies damaged parts based on a relative positional relationship between the damaged area and feature parts in the marked image.

In the foregoing method for identifying a damaged part of a vehicle implemented on the client side or the server side, the user can manually delineate the damage location after taking a photo or video of the damage location by using the client, and then the damaged part is decided and identified on the server side based on the positional relationship. In a method for identifying a damaged part of a vehicle provided by the embodiments in the present description, an identifiable vehicle feature library including a plurality of vehicle parts and a feature correspondence library including relative positional relationships of these vehicle parts can be pre-established. During the loss assessment image capturing procedure, the user can manually delineate the damage location on the client. Then, the identifiable vehicle features in the image can be identified, and the relative positions of the identifiable features and the mark delineated by the user are determined according to these identifiable features. This relative position is further matched in the feature correspondence library to determine the damaged part, which enables assisted locating of the damage location by manual and simple operations by the user at the scene, and assists insurance companies in locating damaged parts of vehicle, thereby improving the accuracy and processing efficiency of identifying a damaged part in loss assessment, and greatly improving the user experience.

Figure 8:
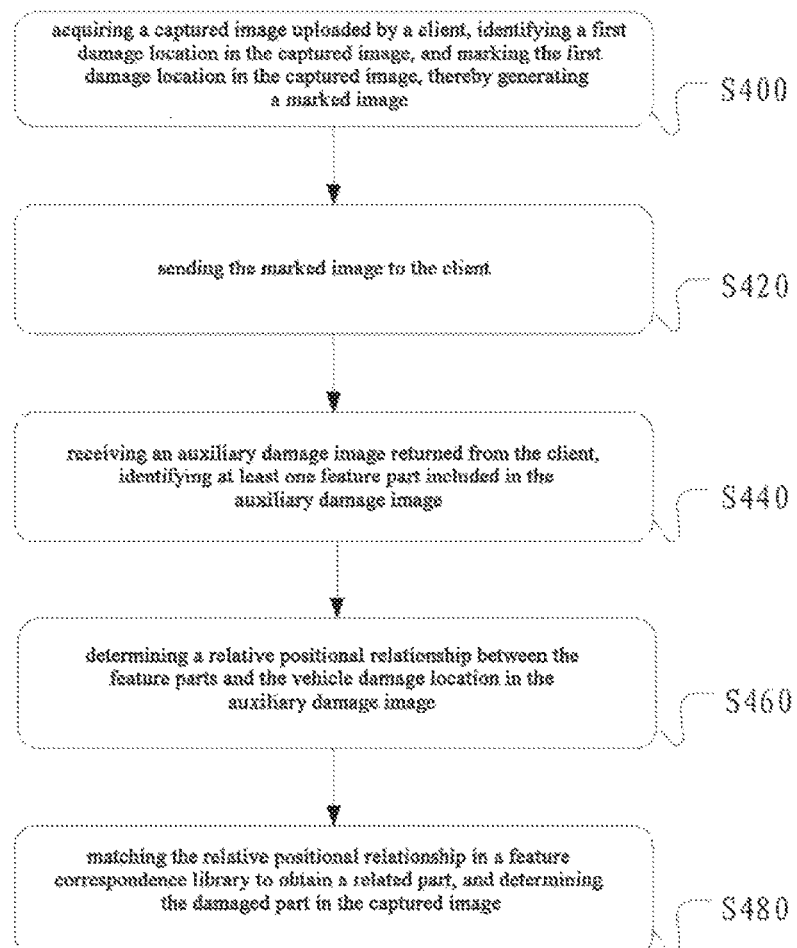
FIG. 8 is a schematic flowchart of another method for identifying a damaged part of a vehicle for a server provided in the present description.

The above-mentioned embodiment of the present description also provides an implementation of client/server interaction in which after the client captures an image, the damaged portion is firstly identified by the server, and is then marked and sent to the user of the client for confirmation. Based on the foregoing client/server interaction implementation, the present description also provides a method for identifying a damaged part of a vehicle that can be used on the server side. Specifically, in an embodiment shown in FIG. 8, the method may include:

S400: acquiring a captured image uploaded by a client, identifying a first damage location in the captured image, and marking the first damage location in the captured image, thereby generating a marked image;

S420: sending the marked image to the client;

S440: receiving an auxiliary damage image returned from the client, identifying at least one feature part included in the auxiliary damage image, the auxiliary damage image including image information formed by confirming a vehicle damage location in the marked image based on an interaction;

S460: determining a relative positional relationship between the feature parts and the vehicle damage location in the auxiliary damage image; and S480: matching the relative positional relationship in a feature correspondence library to obtain a corresponding related part, and determining the damaged part in the captured image based on the related part.

After the marked image is sent to the client, it can be displayed to the user for viewing. The user can confirm the vehicle damage location according to the comparison with the actual vehicle damage situation at the scene, and make adjustments or directly confirm and submit without adjustment. In another embodiment, if the user finds that there are other damage locations that have not been identified and processed by the server, the missed damage location (which may be referred to as a second damage location) can be manually delineated on the client. In this way, the damage location(s) is(are) determined based on the on-site user-assisted observation, and the damaged part can be identified more accurately. Specifically, in another embodiment of the method provided in the present description, S442: the auxiliary damage image further comprises mark information of a second damage location, the second damage location including a new vehicle damage location added to the marked image.

Figure 9:
FIG. 9 is a schematic flowchart of another method for identifying a damaged part of a vehicle for a client provided in the present description.
Figure 10:
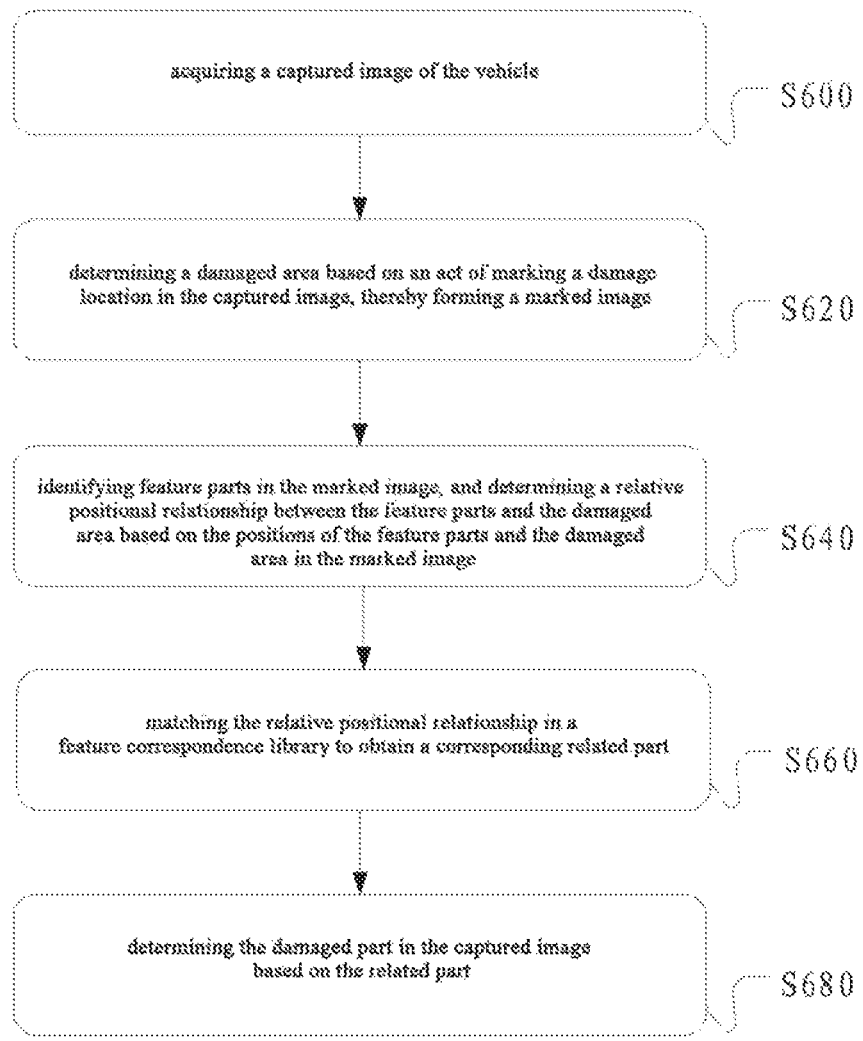
FIG. 10 is a schematic flowchart of a process according to another embodiment of the method provided in the present description.
Figure 11:
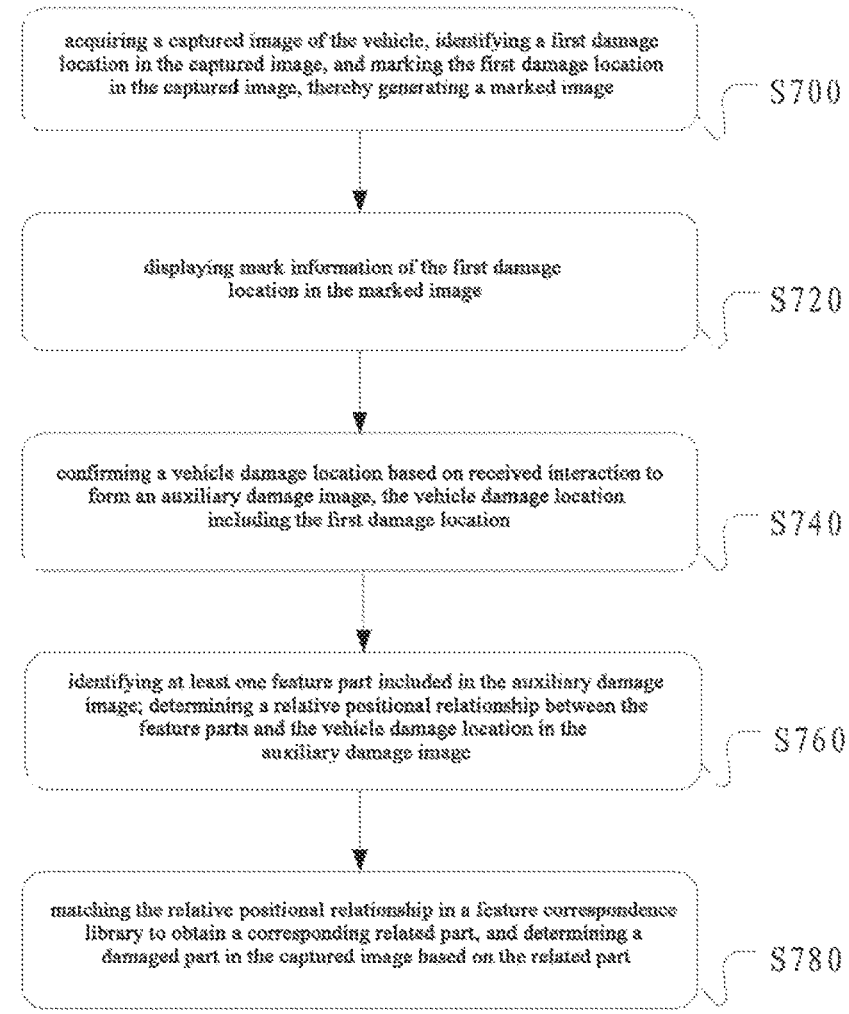
FIG. 11 is a schematic flowchart of a process according to another embodiment of the method provided in the present description.

Based on the above embodiment, the present description also provides an implementation of client/server interaction in which after the client captures an image, the damaged portion is firstly identified by the server, and then marked and sent to the user of the client for confirmation. The present description also provides a method for identifying a damaged part of a vehicle that can be used on the client side. Specifically, in an embodiment shown in FIG. 9, the method may include:

S500: acquiring a captured image of the vehicle and sending the captured image to a server;

S520: receiving a marked image returned from the server, the marked image including image information generated by marking an identified first damage location in the captured image;

S540: displaying mark information for marking the first damage location in the marked image;

S560: confirming a vehicle damage location based on received interaction, the vehicle damage location including the first damage location; and S580: sending an auxiliary damage image of which the vehicle damage location has been confirmed to the server.

As mentioned above, the user can see the damage location of the vehicle in the image preliminarily identified by the server using the client, and then the user can confirm whether the vehicle damage location identified by the server is valid according to the actual situation at the scene, so as to achieve the purpose of on-site user-assisted damaged part identification. In another embodiment of the present description, confirming the vehicle damage location may include:

S562: confirming whether a mark position of the first damage location in the displayed marked image is correct; and if not, adjusting the mark information of the first damage location based on the received interaction.

Adjusting the mark information of the first damage location may include adjusting the position of the mark information in the marked image in some implementation scenarios, and may also include adjusting the size or shape of the mark information. The user can adjust the corresponding displacement of the mark information of the first damage location or other parameters according to the actual vehicle damage situation at the scene.

In another embodiment, the user may also manually mark other vehicle damage locations using the client. In another embodiment of the method as provided in the present description, confirming the vehicle damage location based on the received interaction may include:

S564: confirming mark information of a second damage location based on a received interaction instruction, the second damage location including a new vehicle damage location added to the marked image.

For a specific implementation of the above embodiment for the client side or server side, reference could be made to the foregoing description of the related method embodiment, and details are not described herein.

In another method for identifying a damaged part of a vehicle as provided by the above embodiments in the present description, the user may send the original captured image to the server while capturing the image, and the damage location is preliminarily identified on the server side automatically, which is then marked and transmitted to the client user for confirmation. If the damage location marked by the server is correct, the user can directly confirm and submit it to the system for matching the positional relationship, thereby confirming the damaged part. If the mark by the server is incorrect, the user can make adjustments quickly according to the actual situation at the scene, or add a missed damage location, etc. In this way, the damaged area can be quickly confirmed according to the manual assistance by the user at the scene, and then the damaged part can be matched and confirmed based on the positional relationship between the feature parts identified by the system and the damaged area. Taking advantage of the user being closer to the actual vehicle damage situation at the scene of vehicle damage, the accuracy of the damaged part identification and the user experience on loss assessment can be effectively improved, assisting insurance companies in locating damaged parts of vehicle, improving the accuracy and processing efficiency of identifying a damaged part in loss assessment, and greatly improving the user experience.

In the above embodiments, an implementation is described in which the client takes a photo at the scene of vehicle damage, the user assists in marking the damage location, and the remote server identifies the damaged part based on the positional relationship between the feature parts and the damaged area. As mentioned above, in other embodiments, the above-mentioned processing of capturing images, delineating damaged portion, identifying feature part, and matching positional relationships, etc. may also be completed by a terminal device on one side, for example, images can be captured at the scene by a dedicated client, and the dedicated client is provided with a feature library and feature correspondence library. The user can manually delineate the damaged area on the dedicated client, and then the dedicated client can identify the feature parts and determine the relative positional relationship, etc. by itself, without sending it to the server. The damaged part can be directly identified locally by the dedicated client, or further subsequent loss assessment operations can be completed by the dedicated client. Therefore, the present description may also provide another method for identifying a damaged part of a vehicle, in which damaged parts can be directly identified at the scene according to the user's auxiliary mark. Specifically, the method may include:

S600: acquiring a captured image of the vehicle;

S620: determining a damaged area based on an act of marking a damage location in the captured image, thereby forming a marked image;

S640: identifying feature parts in the marked image, and determining a relative positional relationship between the feature parts and the damaged area based on the positions of the feature parts and the damaged area in the marked image;

S660: matching the relative positional relationship in a feature correspondence library to obtain a corresponding related part; and S680: determining a damaged part in the captured image based on the related part.

Of course, based on the description of the embodiment in which the client captures an image and the server identifies it preliminarily and returns it to the client for confirmation, the present description may also provide another embodiment. Specifically, the method may include:

S700: acquiring a captured image of the vehicle, identifying a first damage location in the captured image, and marking the first damage location in the captured image, thereby generating a marked image;

S720: displaying mark information of the first damage location in the marked image;

S740: confirming a vehicle damage location based on received interaction to form an auxiliary damage image, the vehicle damage location including the first damage location;

S760: identifying at least one feature part included in the auxiliary damage image; determining a relative positional relationship between the feature part and the vehicle damage location in the auxiliary damage image; and S780: matching the relative positional relationship in a feature correspondence library to obtain a corresponding related part, and determining the damaged part in the captured image based on the related part.

It should be noted that the processing methods described above in the embodiment of the present description, in which the operations of client and server can be integrated at the scene of vehicle damage, may include other embodiments according to the foregoing description of the method embodiment for client-server interaction, for example, confirming mark information of a second damage location based on a received interaction instruction, etc. For a specific implementation, reference may be made to the description of the related method embodiment, and details are not described herein.

The embodiments of the method in the present description are described progressively, identical or similar portions of the embodiments may be referenced to each other, and each embodiment focuses on a portion different from other embodiments. For the relevant portions, reference can be made to the descriptions of the method embodiment.

Figure 12:
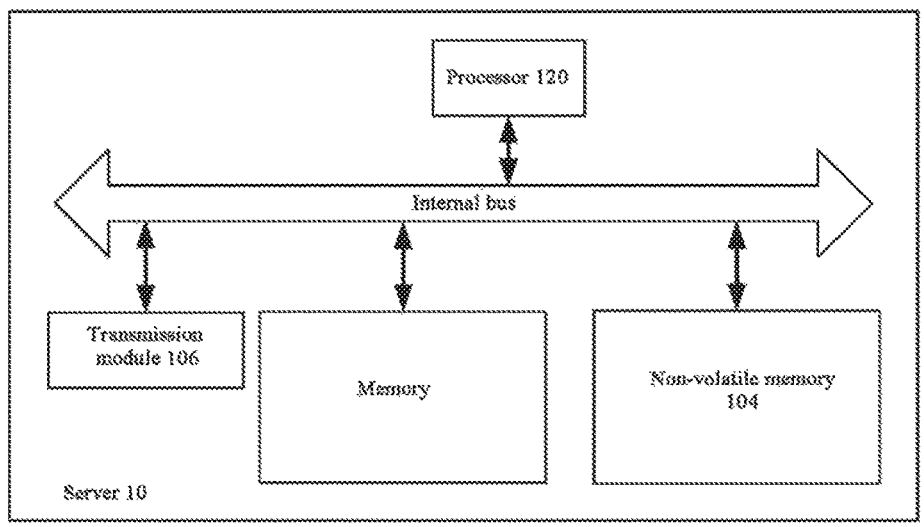
FIG. 12 is a block diagram of a hardware structure of a server for identifying a damaged part of a vehicle in an embodiment of the present invention.

The method embodiments as provided in the embodiments of the present application may be executed in a mobile terminal, a computer terminal, a server, or a similar computing device. Taking the server as an example. FIG. 12 is a block diagram of a hardware structure of a server for identifying a damaged part of a vehicle in an embodiment of the present invention. As shown in FIG. 12, the server 10 may include one or more (only one is shown in this figure) processors 102 (the processors 102 may include, but are not limited to, processing devices such as a microprocessor MCU or programmable logic device FPGA), a memory 104 for storing data, and a transmission module 106 for communication functions. Those of ordinary skill in the art will appreciate that the structure shown in FIG. 12 is merely schematic and does not limit the structure of the electronic device as described above. For example, the server 10 may also include more or fewer components than those shown in FIG. 12, for example, it may further include other pieces of processing hardware, such as a GPU (Graphics Processing Unit), or has configurations different from that shown in FIG. 12.

The memory 104 may be used to store software programs and modules of application software, such as program instructions/modules corresponding to search methods in embodiments of the present invention. The processor 102 executes various functional applications and data processing by running the software programs and modules stored in memory 104, that is, to realize the processing method for displaying contents of the navigation interactive interface described above. The memory 104 may include high-speed random-access memory, and may also include non-volatile memory, such as one or more magnetic storage devices, flash memories, or other non-volatile solid-state memories. In some examples, the memory 104 may further include memory remotely disposed with respect to the processor 102, which may be connected to the computer terminal 10 via network. Examples of such network include, but are not limited to, the Internet, an intranet, a local area network, a mobile communication network, and combinations thereof.

The transmission module 106 is configured to receive or send data via a network. A specific example of the network as described above may include a wireless network provided by a communication provider of the computer terminal 10. In one example, the transmission module 106 includes a Network Interface Controller (NIC), which may be connected to other network devices through a base station so as to communicate with the Internet. In one example, the transmission module 106 may be a Radio Frequency (RF) module for communicating with the Internet wirelessly.

Figure 13:
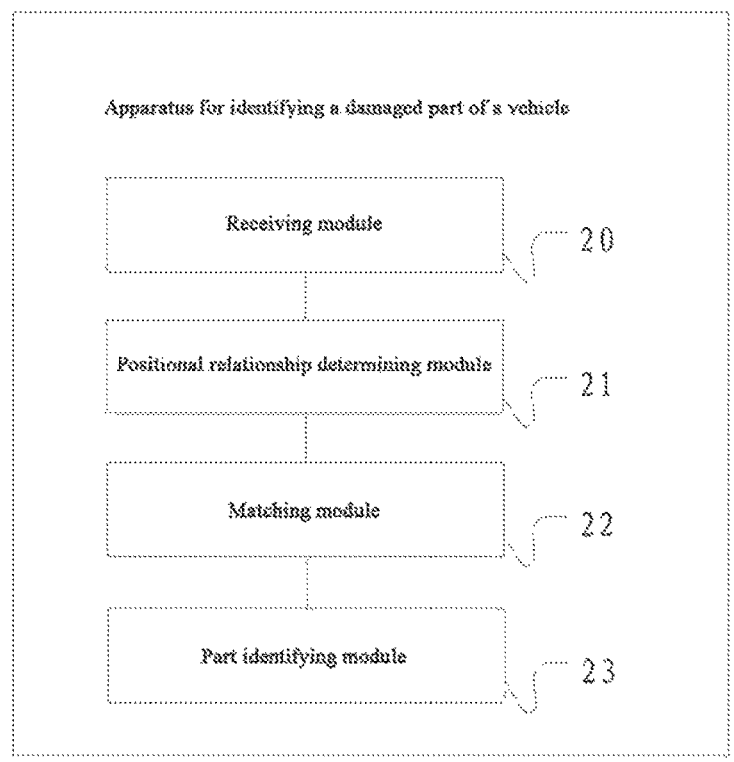
FIG. 13 is a schematic module structure diagram of an embodiment of an apparatus for identifying a damaged part of a vehicle, provided in the present description.

Based on the method for locating an object in image as described above, the present description further provides an apparatus for identifying a damaged part of a vehicle. The apparatus may include an apparatus using a system (including a distributed system), software (application), modules, components, servers, clients, etc, of the method as described in the embodiments of the present description in conjunction with necessary implementation hardware. Based on the same inventive concept, a processing apparatus in an embodiment as provided in the present description is described in the following embodiments. Because the implementation of resolving a problem by using the apparatus is similar to that of the method, for specific processing apparatus implementation in the present description, reference can be made to implementation of the method mentioned above, and details are not repeated here again. Although the apparatus described in the following embodiments is preferably implemented as software, implementation of hardware or a combination of software and hardware may also be conceived. Specifically FIG. 13 is a schematic module structure diagram of an embodiment of an apparatus for identifying a damaged part of a vehicle that can be used on the server side, provided in the present description. As shown in FIG. 13, the apparatus may include:

a receiving module 20 for receiving a marked image uploaded by a client, the marked image including a damaged area determined based on an act of marking a damage location captured image;

a positional relationship determining module 21 for identifying feature parts in the marked image, and determining a relative positional relationship between the feature parts and the damaged area based on the positions of the feature parts and the damaged area in the marked image;

a matching module 22 for matching the relative positional relationship in a feature correspondence library to obtain a corresponding related part; and a part identifying module 23 for determining a damaged part in the captured image based on the related part.

Figure 14:
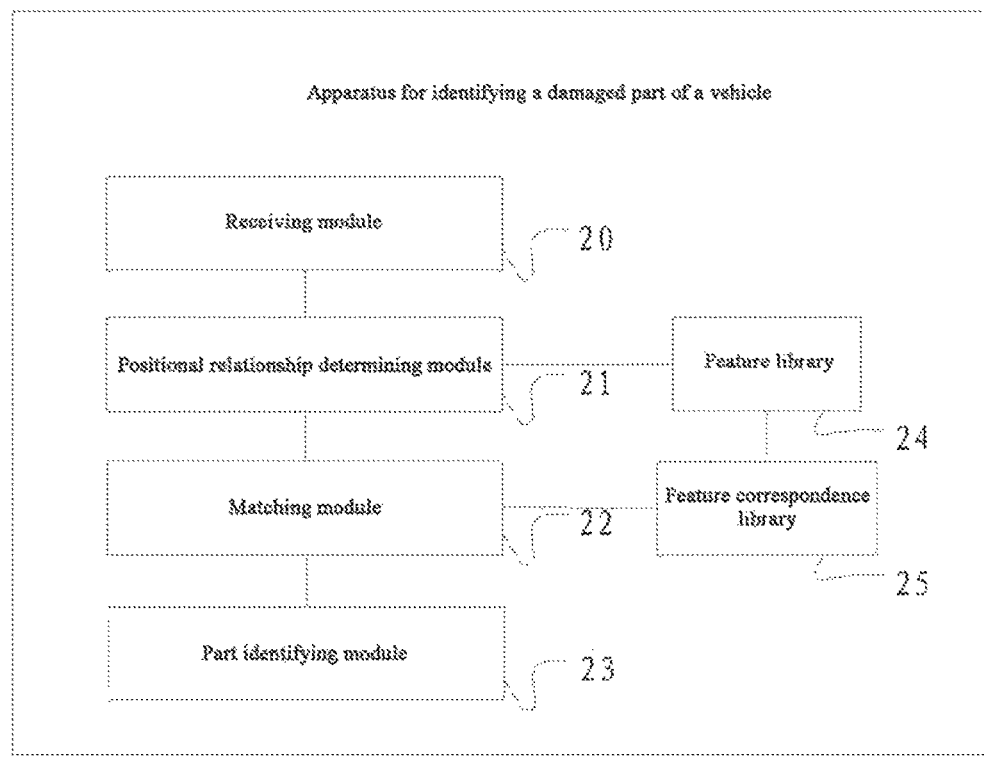
FIG. 14 is a schematic module structure diagram of another embodiment of an apparatus for identifying a damaged part of a vehicle, provided in the present description.

FIG. 14 is a schematic module structure diagram of another embodiment of the apparatus for identifying a damaged part of a vehicle as provided in the present description. As shown in FIG. 14, the apparatus may further include:

a feature library 24 for storing vehicle parts of a vehicle; and a feature correspondence library 25 for storing part positional relationship data constructed using the vehicle parts in the feature library as a reference, the part positional relationship data including the relationship data characterizing at least one of a related part to which an area between vehicle parts pertains, a related part to which the area in a specified direction of a vehicle part pertains, and a related part to which an area of specified proportion between vehicle parts pertains.

In another embodiment of the apparatus as provided in the present description, the specific processing performed by the positional relationship determining module 21 in determining the relative positional relationship between the feature parts and the damaged area may include:

constructing a coordinate system using the center point of the damaged area as an origin;

determining position coordinate data of the feature parts in the coordinate system, respectively; and determining the relative positional relationship between the feature parts and the damaged area based on the position coordinates data of the feature parts.

In another embodiment of the apparatus as provided in the present description, the positional relationship determining module 21 may include:

a feature selecting unit 210 for selecting, when it is identified that the number N of the feature parts in the marked image is greater than 3, K feature parts from the N feature parts to determine the relative positional relationship between the damaged area and the K feature reference parts, wherein In another embodiment of the apparatus provided in the present description, the positional relationship determining module 21 determining the relative positional relationship between the feature parts and the damaged area based on the position coordinate data of the feature parts may include:

transforming the damaged area into a corresponding first regular geometric figure according to the shape of the damaged area;

constructing, in the coordinate system, a second regular geometric figure including an origin and position coordinate data of at least two feature parts;

calculating size of feature area of the first regular geometric figure included in the second regular geometric figures, respectively;

determining scope information on scope of the damaged area between the feature parts based on the sizes of the feature areas and the coordinate distances of the feature parts; and determining the relative positional relationship between the feature parts and the damaged area based on the matching of the scope information.

In another embodiment of the apparatus as provided in the present description, if no positional relationship data matching the relative positional relationship is found in the feature correspondence library by the matching module 22, the positional relationship data having the highest matching degree with the relative positional relationship is acquired; and the related part corresponding to the positional relationship data having the highest matching degree is used as the related part that matches the relative positional relationship.

Figure 15:
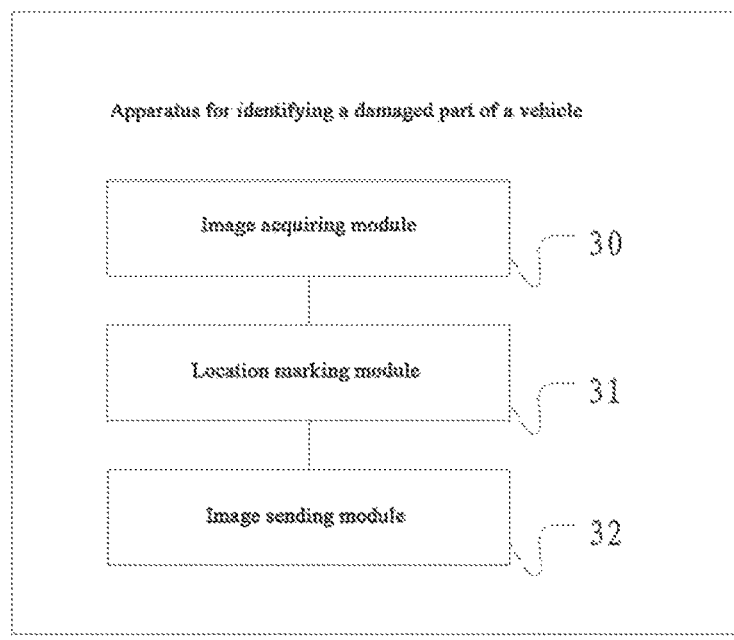
FIG. 15 is a schematic module structure diagram of an embodiment of an apparatus for identifying a damaged part of a vehicle, provided in the present description.

Specifically. FIG. 15 is a schematic module structure diagram of an embodiment of an apparatus for identifying a damaged part of a vehicle that can be used on the client side, as provided in the present description. As shown in FIG. 15, the apparatus may include:

an image acquiring module 30 for acquiring a captured image of the vehicle;

a location marking module 31 for determining a damaged area based on an act of marking a damage location in the captured image, thereby forming a marked image;

an image sending module 32 for sending the marked image to a server, so that the server identifies damaged parts based on a relative positional relationship between the damaged area and feature parts in the marked image.

Figure 16:
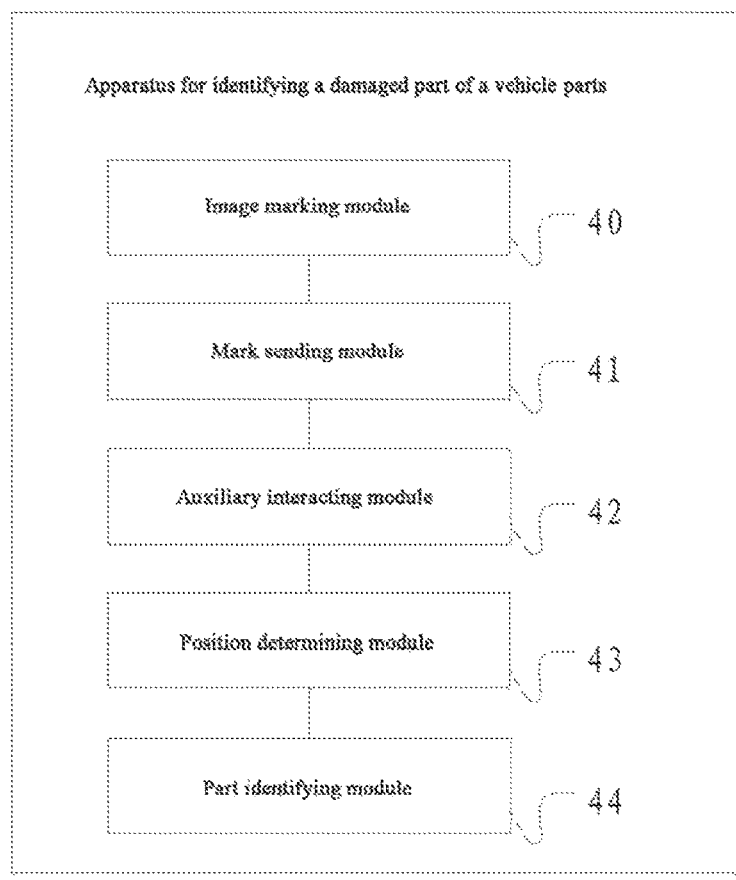
FIG. 16 is a schematic module structure diagram of an embodiment of an apparatus for identifying a damaged part of a vehicle, provided in the present description.

Based on the foregoing description of the method embodiment, the present description also provides another apparatus for identifying a damaged part of a vehicle, which can be used on the server side. Specifically. FIG. 16 is a schematic module structure diagram of an embodiment of an apparatus for identifying a damaged part of a vehicle that can be used on the server side, as provided in the present description. As shown in FIG. 16, the apparatus may include:

an image marking module 40 for acquiring a captured image uploaded by a client, identifying a first damage location in the captured image, and marking the first damage location in the captured image, thereby generating a marked image;

a mark sending module 41 for sending the marked image to the client;

an auxiliary interacting module 42 for receiving an auxiliary damage image returned from the client, identifying at least one feature part included in the auxiliary damage image, the auxiliary damage image including image information formed by confirming a vehicle damage location in the marked image based on an interaction;

a position determining module 43 for determining a relative positional relationship between the feature parts and the vehicle damage location in the auxiliary damage image; and a part identifying module 44 for matching the relative positional relationship in a feature correspondence library to obtain a corresponding related part, and determining the damaged part in the captured image based on the related part.

In another embodiment of the apparatus provided in the present description, the auxiliary damage image received by the auxiliary interacting module 42 may further comprise mark information of a second damage location, the second damage location including a new vehicle damage location added to the marked image.

Figure 17:
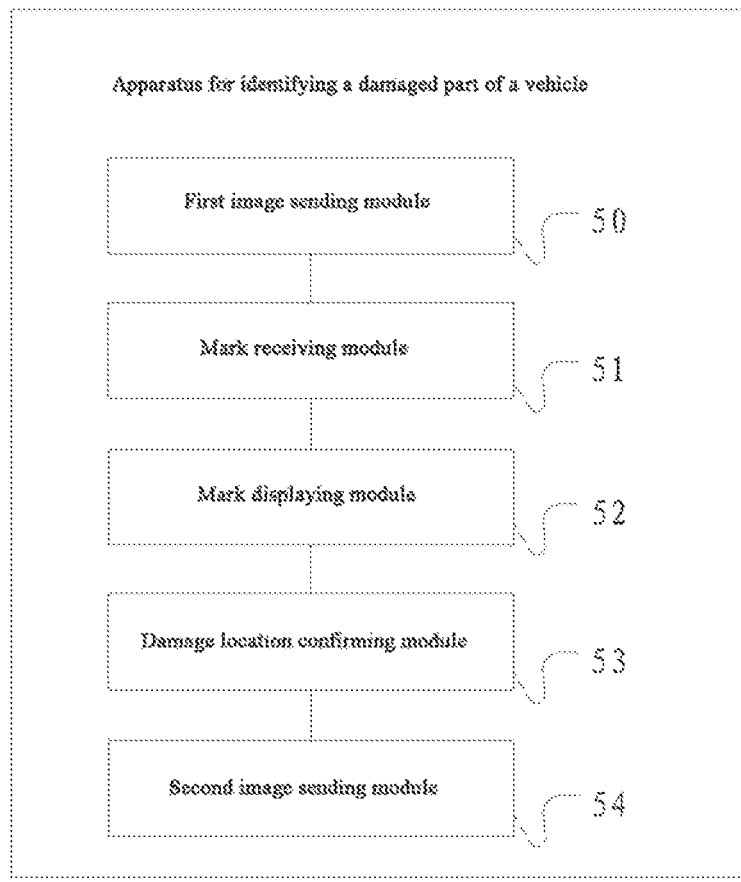
FIG. 17 is a schematic module structure diagram of an embodiment of an apparatus for identifying a damaged part of a vehicle, provided in the present description.

Based on the foregoing description of the method embodiment, the present description also provides another apparatus for identifying a damaged part of a vehicle parts that can be used on the client side. Specifically. FIG. 17 is a schematic module structure diagram of an embodiment of an apparatus for identifying a damaged part of a vehicle that can be used on the client side, as provided in the present description. As shown in FIG. 17, the apparatus may include:

a first image sending module 50 for acquiring a captured image of the vehicle and sending the captured image to a server;

a mark receiving module 51 for receiving a marked image returned by the server, the marked image including image information generated by marking an identified first damage location in the captured image;

a mark displaying module 52 for displaying mark information for marking the first damage location in the marked image;

a damage location confirming module 53 for confirming a vehicle damage location based on received interaction, the vehicle damage location including the first damage location; and a second image sending module 54 for sending an auxiliary damage image of which the vehicle damage location has been confirmed to the server.

In another embodiment of the apparatus as provided in the present description, the damage location confirming module 53 may include:

a first adjustment unit 530 for confirming whether a mark position of the first damage location in the displayed marked image is correct; and if not, adjusting the mark information of the first damage location based on the received interaction.

In another embodiment of the apparatus provided in the present description, the damage location confirming module 53 may include:

a second adjustment unit 532 for confirming mark information of a second damage location based on a received interaction instruction, the second damage location including a new vehicle damage location added to the marked image.

Figure 18:
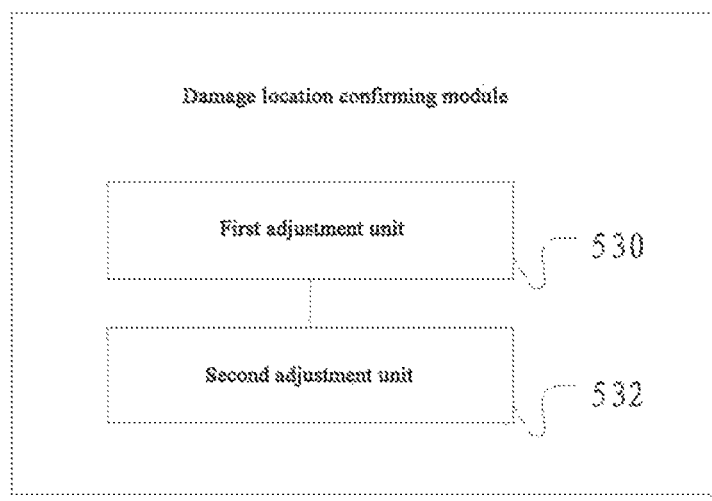
FIG. 18 is a schematic structure diagram of an embodiment of a damage location confirming module provided in the present description.

FIG. 18 is a schematic structure diagram of an embodiment of a damage location confirming module provided in the present description. In some embodiments, the first adjustment unit 530 and the second adjustment unit 532 may be both included.

For a specific implementation of the apparatus described in the above embodiment, reference may be made to the description of the related method embodiment, and details are not described herein.

The method for identifying a damaged part of a vehicle provided by the embodiments of the present description may be implemented by a processor executing corresponding program instructions in a computer, such as implemented at a PC end by using a C++ language in a Windows operating system, or implemented by using a corresponding application design language in another system such as Linux, Android, and iOS in combination with necessary hardware, or implemented based on the processing logic of a quantum computer. Specifically, in an embodiment of a server implementing the above methods provided in the present description, the server may include a processor and a memory for storing processor-executable instructions, and upon execution of the instructions, the processor is configured to:

receive a marked image uploaded by a client, the marked image including a damaged area determined based on an act of marking a damage location in a captured image;

identify feature parts in the marked image, and determine a relative positional relationship between the feature parts and the damaged area based on the positions of the feature parts and the damaged area in the marked image;

match the relative positional relationship in a feature correspondence library to obtain a corresponding related part; and determine a damaged part in the captured image based on the related part.

The user can manually delineate the damaged area on the client, and then the server identifies the feature parts and determines a damaged part based on the relative positional relationship between the damaged area and the feature parts.

Based on the foregoing method embodiment, the present description also provides a client, which may comprise a processor and a memory for storing processor-executable instructions, and upon execution of the instructions, the processor is configured to:

acquire a captured image of a vehicle;

determine a damaged area based on an act of marking a damage location in the captured image, thereby forming a marked image; and send the marked image to a server, so that the server identifies damaged parts based on a relative positional relationship between the damaged area and feature parts in the marked image.

The instructions described above may be stored in a variety of computer-readable storage medium. The computer-readable storage medium may include a physical device for storing information, and the information may be digitized and then stored in a medium using electrical, magnetic, or optical means. The computer-readable storage medium described in this embodiment may include: a device that stores information using electrical energy, for example, various types of memory, such as RAM, ROM, and the like; a device that uses magnetic energy to store information, such as a hard disk, a floppy disk, a magnetic tape, a magnetic core memory, a bubble memory, and a USB; a device that uses optical means to store information, such as CD or DVD. Of course, there are other types of readable storage medium, such as quantum memory, graphene memory, and so on. The instructions in the apparatus or server or client or system described below are the same as those described above.

In a client or server for identifying a damaged part of a vehicle provided by the embodiments in the present description, an identifiable vehicle feature library including a plurality of vehicle parts and a feature correspondence library including relative positional relationships of these vehicle parts can be pre-built. During the loss assessment image capturing procedure, the user can manually delineate the damage location on the client. Then, the identifiable vehicle features in the image can be identified, and the relative positions of the identifiable features and the mark delineated by the user are determined according to these identifiable features. This relative position is further matched in the feature correspondence library to determine the damaged part, which enables assisted locating of the damage location by manual and simple operations by the user at the scene, and assists insurance companies in locating damaged parts of vehicle, thereby improving the accuracy and processing efficiency of identifying a damaged part in loss assessment, and greatly improving the user experience.

In another embodiment of the server, after the user captured an image, the damaged area may also be identified by the server first, and then marked and returned to the user for confirmation. The user can make adjustments quickly according to the actual situation at the scene, such as adding or deleting damaged area, adjusting the position or size or shape of the damaged area identified by the server, etc. Specifically, the server may include a processor and a memory for storing processor-executable instructions, and upon execution of the instructions, the processor is configured to:

acquire a captured image uploaded by a client, identify a first damage location in the captured image, and mark the first damage location in the captured image, thereby generating a marked image;

send the marked image to the client;

receive an auxiliary damage image returned from the client, identify at least one feature part included in the auxiliary damage image, the auxiliary damage image including image information formed by confirming a vehicle damage location in the marked image based on an interaction;

determine a relative positional relationship between the feature part and the vehicle damage location in the auxiliary damage image; and match the relative positional relationship in a feature correspondence library to obtain a corresponding related part, and determine damaged parts in the captured image based on the related part.

In another embodiment of the client, the client may include a processor and a memory for storing processor-executable instructions, and upon execution of the instructions, the processor is configured to:

acquire a captured image of a vehicle and send the captured image to a server;

receive a marked image returned by the server, the marked image including image information generated by marking an identified first damage location in the captured image;

display mark information for marking the first damage location in the marked image;

confirm a vehicle damage location based on received interaction, the vehicle damage location including the first damage location; and send an auxiliary damage image of which the vehicle damage location has been confirmed to the server.

In another client or server for identifying a damaged part of a vehicle provided by the foregoing embodiments in the present description, the user may send the original captured image to the server while the image is captured, and the damage location is preliminarily identified on the server side automatically, which is then marked and transmitted to the client user for confirmation. If the damage location marked by the server is correct, the user can immediately confirm and submit it to the system for matching the positional relationship, thereby confirming the damaged part. If the mark by the server is incorrect, the user can make adjustments quickly according to the actual situation at the scene, or add a missed damage location, etc. In this way, the damaged area can be quickly confirmed according to the manual assistance by the user at the scene, and then the damaged part can be matched and confirmed based on the positional relationship between the feature parts identified by the system and the damaged area. Taking advantage of the user being closer to the real vehicle damage situation at the scene of vehicle damage, the accuracy of the damaged part identification and the user experience on loss assessment can be effectively improved, assisting insurance companies in locating damaged parts of vehicle, improving the accuracy and processing efficiency of identifying a damaged part in loss assessment, and greatly improving the user experience.

Figure 19:
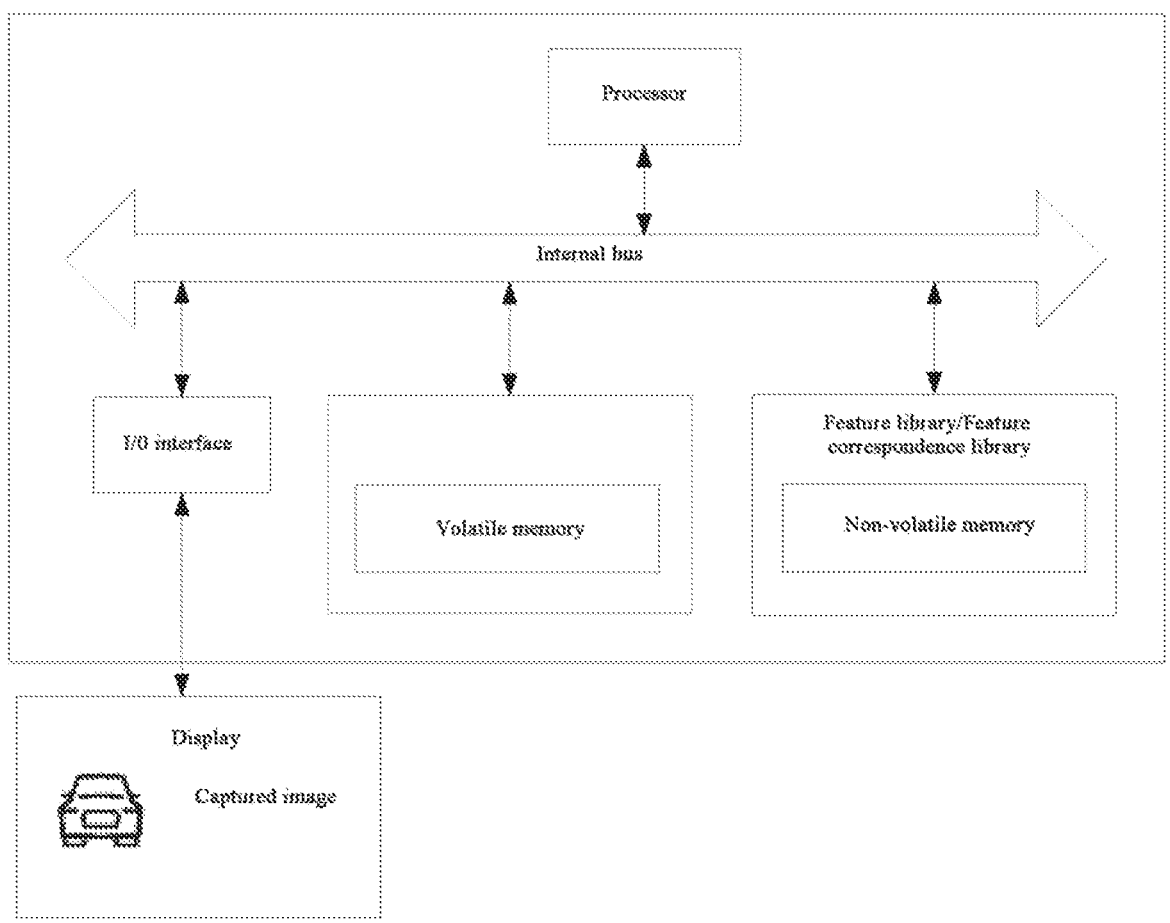
FIG. 19 is a schematic structure diagram of an embodiment of an electronic device provided in the present description.

Based on the foregoing, an embodiment of the present description further provides an electronic device including a display, a processor and a memory storing processor-executable instructions. The electronic device may include an on-site dedicated device which is integrated with the feature library and feature correspondence library, so that it is possible to identify the damaged part directly while taking photos at the scene of vehicle damage or further complete the vehicle loss assessment. FIG. 19 is a schematic structure diagram of an embodiment of an electronic device as provided in the present description. The display may include a device that displays information content, such as a touch screen, a liquid crystal display, and a projection device. The type of the electronic device may include a mobile terminal, a dedicated auto insurance device, a car-machine interactive device, a personal computer, and the like. When executing the instructions, the processor is configured to:

acquire a captured image of a vehicle;

determine a damaged area based on an act of marking a damage location to the captured image on the display, thereby forming a marked image;

identify feature parts in the marked image, and determine a relative positional relationship between the feature parts and the damaged area based on the positions of the feature parts and the damaged area in the marked image;

match the relative positional relationship in a feature correspondence library to obtain a corresponding related part; and determine a damaged part in the captured image based on the related part.

In another embodiment of the electronic device provided in the present description, the electronic device may also include a display, a processor and a memory storing processor-executable instructions, and upon execution of the instructions, the processor is configured to:

acquire a captured image of a vehicle, identify a first damage location in the captured image, and mark the first damage location in the captured image, thereby generating a marked image;

display, on the display, mark information of the first damage location in the marked image;

confirm a vehicle damage location based on received interaction to form an auxiliary damage image, the vehicle damage location including the first damage location;

identify at least one feature part included in the auxiliary damage image; determine a relative positional relationship between the feature part and the vehicle damage location in the auxiliary damage image; and match the relative positional relationship in a feature correspondence library to obtain a corresponding related part, and determine the damaged part in the captured image based on the related part.

It should be noted that the apparatus and the electronic device described above in the embodiments of the present description may also include other embodiments according to the descriptions in the relevant method embodiments. For a specific implementation, reference can be made to descriptions in the method embodiments, which is not described herein again.

The embodiments in the present description are described progressively, identical or similar portions of the embodiments may be obtained with reference to each other, and each embodiment focuses on a portion different from other embodiments. In particular, the hardware plus program embodiments are basically similar to the method embodiments, thus being described briefly. For related portions, the descriptions of the portions in the method embodiments could be referred.

Specific embodiments of the present description have been described above. Other embodiments will fall within the scope of the appended claims. Under some circumstances, the actions or steps described in the claims may be performed in an order different from that in the embodiments and still can achieve a desired result. In addition, the processes depicted in the accompanying drawings are unnecessary in the shown order or consecutive order to achieve the desired result. In some embodiments, multitask processing and parallel processing are also possible or may be advantageous.

Based on the foregoing description of the embodiment of the method or apparatus for identifying a damaged part of a vehicle by the client-server interaction, the present description also provides a system for identifying a damaged part of a vehicle. The system may include a first client and a first server, wherein the first client may implement the processing method of any one of the client embodiments in the application scenario in which the damage location is manually marked by the client and is identified and processed by the server, the first server may implement the processing method of any one of the server embodiments in the application scenario in which the damage location is manually marked by the client and is identified and processed by the server.

The present description also provides another system for identifying a damaged part of a vehicle. The system may include a second client and a second server, wherein the second client may implement the processing method of any one of the client embodiments in the application scenario in which the client captures an image and the server identifies it preliminarily and returns it to the client for confirmation, the second server may implement the processing method of any one of the server embodiments in the application scenario in which the client captures an image and the server identifies it preliminarily and returns it to the client for confirmation.

Although the present application provides the operation steps of the method in an embodiment or a flowchart, more or fewer operation steps can be included based on conventional or non-inventive effort. The order of the steps enumerated in the embodiments is merely one of a plurality of orders for step execution, and does not represent a unique order for execution. In practice, when executed in an apparatus or a client device, the steps can be executed in an order shown in an embodiment or a method shown in the accompanying drawings, or executed in parallel (for example, in an environment of parallel processors or multi-thread processing).

Although the content of the embodiments of the present description mentions operations and data descriptions such as data acquisition, position arrangement, interaction, calculation, and judgment, for example, constructing a feature library or feature correspondence library, marking the damage location with a rectangular frame, determining the positional relationship based on the area size, using a convolutional neural network to identify the damage location preliminarily, etc., the embodiments of the present description are not limited to the situations that must conform to industry communication standards, standard image data processing protocols, communication protocols, and standard data models/templates or described in embodiments of the present description. An implementation solution which is derivable with minor modification based on some industry standards, or by using a self-defined method, or based on implementation described in the embodiments can also achieve an implementation effect that is the same as, equivalent to, or similar to the embodiments mentioned above or that can be predicted after variation. An embodiment derived by using changed or modified data acquisition, data storage, data determining, and data processing method is still within the scope of optional implementation solutions of the present description.

In 1990s, an improvement on a technology can be obviously classified as an improvement on hardware (e.g., an improvement on a circuit structure such as a diode, a transistor, and a switch) or an improvement on software (an improvement on a method procedure). However, with the development of technologies, improvements of many method procedures at present can be considered as direct improvements on hardware circuit structures. Almost all designers program the improved method procedures into hardware circuits to obtain corresponding hardware circuit structures. Therefore, it is improper to assume that the improvement of a method procedure cannot be implemented by using a hardware module. For example, a Programmable Logic Device (PLD) (e.g., a Field Programmable Gate Array (FPGA)) is such an integrated circuit, and its logic functions are determined by a user programming the device. Designers program by themselves to "integrate" a digital system into a PLD, without asking a chip manufacturer to design and manufacture a dedicated integrated circuit chip. Moreover, at present, programming is mostly implemented by using logic compiler software instead of manually manufacturing an integrated circuit chip. The logic compiler software is similar to a software complier used for developing and writing a program, and source codes before compiling also need to be written by using a specific programming language, which is referred to as a Hardware Description Language (HDL). There are many types of HDLs, such as Advanced Boolean Expression Language (ABEL). Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art should also know that a hardware circuit for implementing the logic method procedure can be easily obtained by slightly logically programming the method procedure using the above several hardware description languages and programming it into an integrated circuit.

A controller can be implemented in any suitable manner. For example, the controller can take the form of a microprocessor or a processor and a computer readable medium that stores computer readable program codes (such as software or firmware) executable by the microprocessor or processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The controller of the memory can further be implemented as a part of control logic of the memory. Those skilled in the art also know that in addition to implementing the controller by using computer readable program codes only, it is completely feasible to logically program the method steps to enable the controller to implement the same function in a form of logic gate, switch, ASIC, programmable logic controller, and embedded microcontroller, etc. Therefore, such a controller may be considered as a hardware component, and apparatuses included in the controller and configured to implement various functions may also be considered as structures inside the hardware component. Or, the apparatuses configured to implement various functions may even be considered as both software modules configured to implement the method and structures inside the hardware component.

Specifically, the system, apparatus, modules or units illustrated in the foregoing embodiments can be implemented by a computer chip or a physical entity, or implemented by a product having a specific function. A typical implementation device is a computer. Specifically, for example, the computer can be a personal computer, a laptop computer, an on-board human-computer interaction device, a cellular phone, a camera phone, a smart phone, a personal digital assistant, a media player, a navigation device, an email device, a game console, a tablet computer, a wearable device, or a combination of any of these devices.

Although the embodiments of the present description provide the operation steps of the method in an embodiment or a flowchart, more or fewer operation steps can be included based on conventional or non-inventive means. The order of the steps enumerated in the embodiments is merely one of a plurality of orders for step execution, and does not represent a unique order for execution. In practice, when an apparatus or a terminal product executes the steps, the execution can be performed in an order shown in an embodiment or a method shown in the accompanying drawings, or performed in parallel (for example, in an environment of parallel processors or multi-thread processing, and even in a distributed data processing environment). The terms "include", "comprise" or any other variations thereof are intended to cover non-exclusive inclusion, so that a process, method, product or device including a series of elements not only includes those elements, but also includes other elements not expressly listed, or further includes elements inherent to the process, method, product or device. In the absence of more limitations, the presence of additional identical or equivalent elements in a process, method, product or device comprising said elements is not to be excluded.

For ease of description, the apparatus is divided into various modules based on functions, and the modules are described separately. Of course, when implementing the embodiments of the present description, the functions of various modules may be implemented in one or more pieces of software and/or hardware, or the modules implementing the same function may be implemented by a combination of multiple sub-modules or sub-units, or the like. The apparatus embodiments described above are merely illustrative. For example, the division of the units is merely a division of logical functions and there can be some other divisions in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electrical, mechanical, or other forms.

Those skilled in the art also know that in addition to implementing the controller by using computer readable program codes only, it is completely feasible to logically program the method steps to enable the controller to implement the same function in a form of logic gate, switch, ASIC, programmable logic controller, and embedded microcontroller. Therefore, such a controller may be considered as a piece of hardware component, and apparatuses included in the controller and configured to implement various functions may also be considered as structures inside the hardware component. Or, the apparatuses configured to implement various functions may even be considered as both software modules configured to implement the method and structures inside the hardware component.

The present invention is described with reference to flowcharts and/or block diagrams of the method, the device (system) and the computer program product according to the embodiments of the present invention. It should be understood that computer program instructions may be used to implement each process and/or block in the flowcharts and/or block diagrams and combinations of processes and/or blocks in the flowcharts and/or block diagrams. The computer program instructions may be provided to a general-purpose computer, a special-purpose computer, an embedded processor or a processor of another programmable data processing device to generate a machine, such that instructions executed by the computer or the processor of another programmable data processing device generate an apparatus configured to implement functions designated in one or more processes in a flowchart and/or one or more blocks in a block diagram.

The computer program instructions may also be stored in a computer readable memory that can guide the computer or another programmable data processing device to work in a specific manner, such that the instruction stored in the computer readable memory generates an article of manufacture including an instructing device, and the instructing device implements functions designated in one or more processes in a flowchart and/or one or more blocks in a block diagram.

The computer program instructions may also be loaded to the computer or another programmable data processing device, such that a series of operational steps are executed on the computer or another programmable device to generate a computer implemented processing, and therefore, the instruction executed in the computer or another programmable device provides steps for implementing functions designated in one or more processes in a flowchart and/or one or more blocks in a block diagram.

In a typical configuration, the computing device includes one or more central processing units (CPUs), an input/output interface, a network interface, and a memory.

The memory can include computer readable medium such as a volatile memory, a Random Access Memory (RAM), and/or non-volatile memory, e.g., a Read-Only Memory (ROM) or a flash RAM. The memory is an example of a computer readable medium.

The computer readable medium includes non-volatile and volatile media as well as movable and non-movable media, and can implement information storage by means of any method or technology. The information can be a computer readable instruction, a data structure, a program module or other data. An example of the storage medium of a computer includes, but is not limited to, a phase change memory (PRAM), a static random access memory (SRAM), a dynamic random access memory (DRAM), other types of RAM, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition in this text, the computer readable medium does not include transitory media, such as a modulated data signal and a carrier.

Those skilled in the art should understand that the embodiments of the present description can be provided as a method, a system, or a computer program product. Therefore, the embodiments of the present description may be implemented in a form of a complete hardware embodiment, a complete software embodiment, or an embodiment combining software and hardware. Moreover, the embodiments of the present description can be in the form of a computer program product implemented on one or more computer usable storage medium (including, but not limited to, a magnetic disk memory, a CD-ROM, an optical memory and the like) including computer usable program codes.

The embodiments of the present description can be described in a general context of a computer executable instruction executed by a computer, for example, a program module. Generally, the program module includes a routine, a program, an object, a component, a data structure, and the like used for executing a specific task or implementing a specific abstract data type. The embodiments of the present description can also be implemented in distributed computing environments. In these distributed computing environments, a task is executed by using remote processing devices connected via, a communications network. In a distributed computing environment, the program module may be located in local and remote computer storage medium including a storage device.

The embodiments in the present description are described progressively, identical or similar portions of the embodiments may be obtained with reference to each other, and each embodiment focuses on a portion different from other embodiments. Especially, the system embodiment is basically similar to the method embodiment, thus being described briefly; and for the relevant portions, reference can be made to the descriptions of the method embodiment. In the descriptions of the present application, reference terms as "an embodiment", "some embodiments", "an example", "a specific example", or "some examples" mean that specific features, structures, materials, or characteristics described with reference to the embodiments or examples are included in at least one embodiment or example of the present application. In the present description, the foregoing terms are described not necessarily for the same embodiment or example. In addition, the described specific features, structures, materials, or characteristics can be combined in a proper manner in any one or more of the embodiments or examples. Furthermore, a person skilled in the art can combine different embodiments or examples described in the present description and features of different embodiments or examples without mutual contradiction.

The foregoing descriptions are merely embodiments of the present application, and are not intended to limit the present application. For a person skilled in the art, the embodiments of the present description can have various changes and variations. Any modifications, equivalent replacements, or improvements made within the spirit and principle of the present application shall fall within the scope of the claims in the present application.

What is claimed is:

1. A method for identifying a damaged part of a vehicle by a server comprising a processor and a memory for storing instructions which are executable by the processor, wherein upon execution of the instructions, the processor is configured to:

receiving a marked image uploaded by a client, said marked image including a damaged area determined based on an act of marking a damage location in a captured image;

identifying feature parts in said marked image, and determining a relative positional relationship between said feature parts and said damaged area based on the positions of said feature parts and said damaged area in the marked image, said relative positional relationship between said feature parts and said damaged area including one of the direction of said feature part with respect to said damaged area, the distance from said feature part to said damaged area, and the distance percentage of the distance from said feature part to said damaged area, or a combination thereof;

matching the relative positional relationship in a feature correspondence library to obtain a corresponding related part; and determining the damaged part in said captured image based on said related part.

2. The method according to claim 1, wherein, said feature parts comprise vehicle parts included in a constructed feature library, and said feature correspondence library comprises part positional relationship data constructed by using the vehicle parts in said feature library as a reference, the part positional relationship data including relationship data characterizing at least one of a related part to which an area between vehicle parts pertains, a related part to which the area in a specified direction of a vehicle part pertains, and a related part to which an area of specified proportion between vehicle parts pertains.

3. The method according to claim 1, wherein determining the relative positional relationship between said feature parts and said damaged area comprises:

constructing a coordinate system by using a center point of said damaged area as an origin;

determining position coordinate data of said feature parts in said coordinate system, respectively; and determining the relative positional relationship between said feature parts and said damaged area based on the position coordinate data of said feature parts.

4. The method according to claim 3, the processor is further configured to:

selecting, if it is identified that the number N of the feature parts in said marked image is greater than 3, K feature parts from the N feature parts to determine the relative positional relationship between said damaged area and said K feature reference parts, wherein 2≤K≤3.

5. The method according to claim 4, wherein determining the relative positional relationship between said feature parts and said damaged area based on the position coordinate data of said feature parts comprises:

transforming said damaged area into a corresponding first regular geometric figure according to the shape of said damaged area;

constructing, in said coordinate system, second regular geometric figures including said origin and position coordinate data of at least two feature parts;

calculating size of feature area of the first regular geometric figure included in said second regular geometric figures, respectively;

determining a scope information on scope of said damaged area between said feature parts based on the sizes of said feature areas and the coordinate distances of said feature parts; and determining the relative positional relationship between said feature parts and said damaged area based on matching of said scope information.

6. The method according to claim 1, the processor is further configured to:

acquiring, if no positional relationship data matching said relative positional relationship is found in said feature correspondence library, positional relationship data having the highest matching degree with said relative positional relationship; and using the related part corresponding to the positional relationship data having the highest matching degree as the related part that matches said relative positional relationship.

* * * * *